(12) United States Patent
Cimino

(10) Patent No.: US 7,341,195 B2
(45) Date of Patent: Mar. 11, 2008

(54) SYSTEM AND METHOD FOR TARGETED EDUCATION AND ADVERTISING

(76) Inventor: Deirdre M. Cimino, 564 Worthington Rd., Chester Springs, PA (US) 19425

( * ) Notice: Subject to any disclaimer, the term of this patent is extended or adjusted under 35 U.S.C. 154(b) by 0 days.

(21) Appl. No.: 10/956,492

(22) Filed: Sep. 30, 2004

(65) Prior Publication Data

US 2005/0092827 A1  May 5, 2005

Related U.S. Application Data

(60) Provisional application No. 60/537,731, filed on Jan. 20, 2004, provisional application No. 60/507,619, filed on Oct. 1, 2003.

(51) Int. Cl.
*G06K 19/00* (2006.01)
(52) U.S. Cl. .................. 235/487; 235/375; 235/462.01; 235/472.01
(58) Field of Classification Search ........... 235/472.01, 235/472.02, 462.01, 375, 495
See application file for complete search history.

(56) References Cited

U.S. PATENT DOCUMENTS 5,781,914 A * 7/1998 Stork et al. ................. 715/506
5,905,248 A * 5/1999 Russell et al. ......... 235/462.15

* cited by examiner

*Primary Examiner*—Seung Ho Lee
(74) *Attorney, Agent, or Firm*—Charles N. Quinn

(57) ABSTRACT

A method and apparatus for targeted education and advertising preferably includes sanitary paper comprising a plurality of portions and a consumer-friendly message disposed on at least one of the plurality of portions. The consumer-friendly message preferably comprises commercial or non-commercial health-related advertising information. A URL is preferably disposed on the at least one of the plurality of portions and the URL is preferably associated with a host computer system hosting a health-related newsletter template. The paper preferably also includes a code disposed on the at least one of the plurality of portions, where the code is preferably associated with the health-related advertising information and health-related newsletter content.

21 Claims, 11 Drawing Sheets

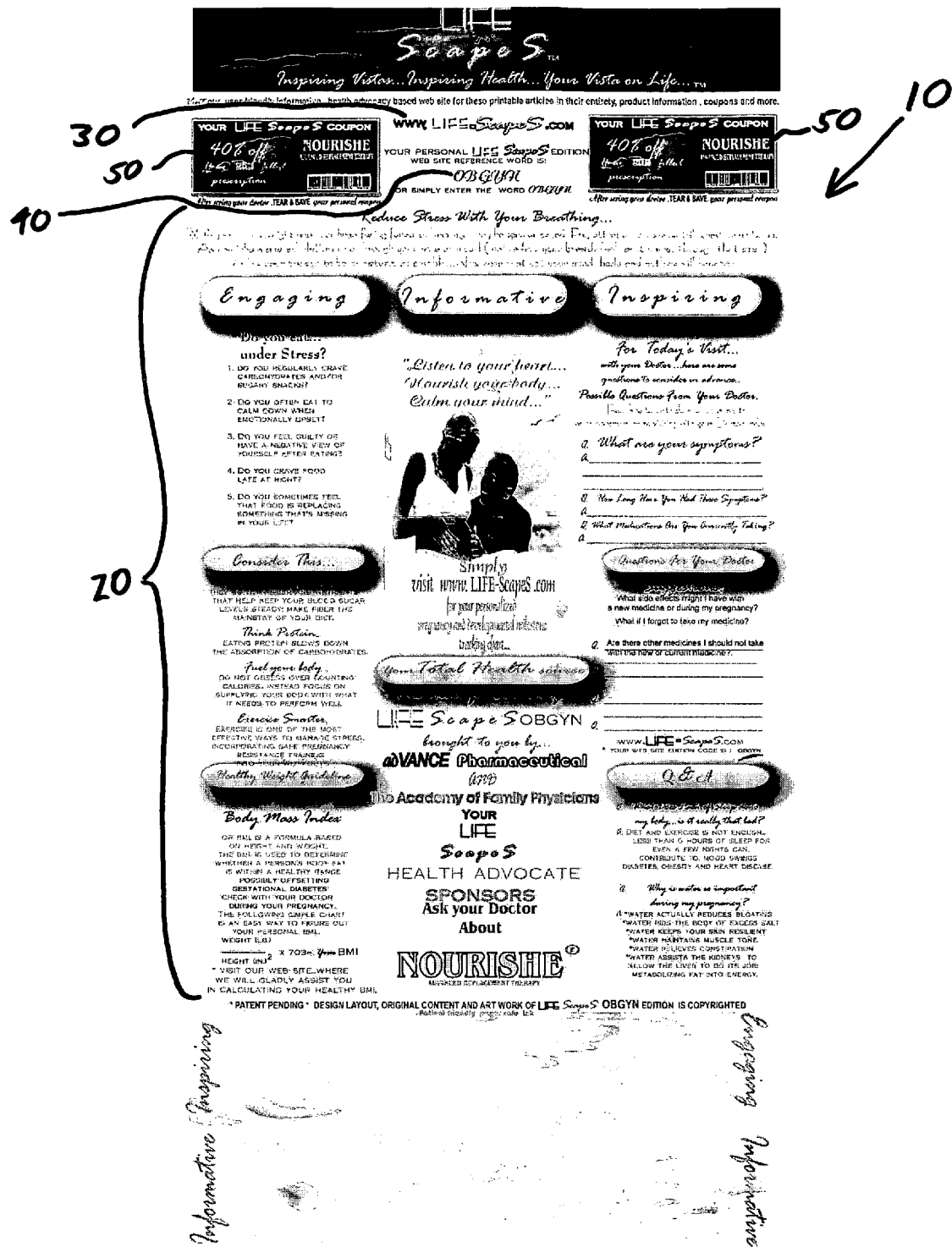
Figure 1c  *Engaging  Informative  Inspiring*

SYSTEM AND METHOD FOR TARGETED EDUCATION AND ADVERTISING

CROSS-REFERENCE TO RELATED APPLICATIONS

The present application claims the benefit under 35 U.S.C. § 119(e) of U.S. provisional patent application 60/507,619, filed Oct. 1, 2003, and U.S. provisional patent application 60/537,731, filed Jan. 20, 2004, which are both hereby incorporated by reference in their entirety for all purposes.

BACKGROUND OF THE INVENTION—FIELD OF THE INVENTION

The invention relates generally to systems, methods and apparatus for targeted education and advertising, and more specifically to the strategic placement of health-related advertising information corresponding to an electronic newsletter associated with the health-related advertising information.

The health-related advertising information may comprise commercial advertising. However, the health-related advertising information may also comprise noncommercial information for inducing consumers to seek more information concerning healthy living. Preferred embodiments of the invention are concerned with the dissemination of information to consumers, e.g. patients, to induce and empower consumers to obtain further knowledge from a related web site.

BACKGROUND OF THE INVENTION—DESCRIPTION OF THE PRIOR ART

The doctor's office or other medical facility is an educational channel that has failed to be effectively developed with regard to consumer advertising. While pharmaceutical sales representatives often provide "free samples" of their pharmaceutical products to doctors for distribution to patients, these samples fail to meaningfully advertise the pharmaceutical or the company to the patient. Such methods primarily suffice as advertising to a demographic including the doctor and other medical professionals in hopes that the doctor will prescribe the product in the future.

Previous types of direct marketing to consumers at medical facilities include the placement of medical diagrams or charts on the walls of the medical facility, such as in a doctor's examination room, for example. However, while these charts are purportedly informative to consumers, they are limited in actually providing useful information to a consumer, focusing rather on anatomy or the contents, uses and side effects of certain drugs. Such charts and diagrams are lacking in that they fail to address the total health and wellness of an individual. Furthermore, these diagrams and charts are left on the wall of the medical facility for long periods of time, such that the information contained therein often becomes outdated, incorrect, unsupported and/or incomplete.

Supply Marketing, Inc., has attempted to exploit this channel of advertising by offering for distribution to physicians branded products prominently displaying a corporate logo, including branded disposable gowns, tray liners, exam table paper, dental bibs, etc. However, while a consumer may often have questions regarding the company and/or products associated with the corporate logo, the consumer is left with little recourse apart from speaking with the consumer's physician. Unfortunately, physician time is expensive to consumers and doctors have incentives to minimize the amount of time they spend with each consumer.

Direct marketing to consumers in the doctor's office or other medical facility is limited, failing to provide consumers with comprehensive information. However, medical facilities are a prime channel for advertising to consumers with enormous potential. What is needed is a medium for the creative display of inspiring perspectives and incorporating current health-related topics that are preferably presented in an engaging, informative and inspiring view. What is also needed is a way for the consumer to efficiently obtain additional follow-up information by using the Internet or other communications medium.

SUMMARY OF THE INVENTION

Preferred embodiments of the present invention include systems, methods and apparatus for targeted education and advertising. The invention preferably includes and utilizes a disposable medium, such as sanitary paper. Although preferred embodiments of the invention comprise any suitable medium, sanitary paper is preferred and, for the purposes of clarity, sanitary paper is used herein as the preferred embodiment of the medium.

The sanitary paper preferably comprises a plurality of portions and a consumer-friendly message disposed on at least one of the plurality of portions. The consumer-friendly message preferably includes health-related advertising information; however the health-related advertising information is preferably minimal and is not geared towards patient exploitation. The invention preferably includes a uniform resource locator (URL), which is preferably disposed on the at least one of the plurality of portions, and the URL is preferably associated with a host computer system hosting a health-related newsletter template. The invention also preferably includes a code disposed on the at least one of the plurality of portions, the code being associated with the health-related advertising information and health-related newsletter content. In some embodiments of the sanitary paper, the URL includes the code, such as for example, a sub-domain name contained within the URL. In preferred embodiments of the sanitary paper, the code is separate from the URL. The sanitary paper preferably includes a seating area.

Preferred embodiments of health-related advertising information do not require inclusion of commercial advertising information. For example, while health-related advertising information can include content that touts a product or is otherwise commercial in character, the health-related advertising information preferably includes educational content from unpaid sponsors. The terms "advertiser", "health-related advertising information", "advertiser computer system", etc. as used herein do not necessarily denote or require a commercial nexus.

For example, while health-related advertising information could include an article touting a pharmaceutical company's new drug, preferred embodiments of health-related advertising information include, for example, an informative article about heart disease sponsored by a nonprofit group. Continuing with another example, preferred embodiments of health-related advertising information include both an informative article about heart disease, as well as an article touting a new drug. The health-related advertising information preferably includes more educational content than commercial content. However, the ratio of commercial health-related advertising information to noncommercial health-related advertising information varies as desired by, for example, the entity granting final approval of the content of the consumer-friendly message.

The sanitary paper is preferably examination table sanitary paper, where each of the plurality of portions of the sanitary paper is preferably a section of the examination table sanitary paper. The sanitary paper is preferably rolled and each of the sections are preferably demarcated from one another. In some embodiments of the sanitary paper, each of the sections is perforatably attached to each adjacent section. Some preferred embodiments of the sanitary paper include baby tray sanitary paper, where each of the plurality of portions of the sanitary paper are separate pieces of baby tray sanitary paper, which can be used, for example, at a baby changing station.

The host computer system preferably receives the code from a consumer, and the code is preferably associated with at least one of the consumer-friendly message, the health-related advertising information, a medical or other facility where the medium bearing the consumer-friendly message is displayed, a health practice category associated with the medical facility, an advertiser and other information. The code is preferably representative of the associative relationship between the health-related advertising information and the health-related newsletter content.

The host computer system preferably populates the health-related newsletter template in accordance with a code disposed on the sanitary paper to create an edition of a health-related newsletter, and the host computer system preferably communicates the edition of the health-related newsletter to a consumer computer system or other telecommunicative device. The edition is preferably not communicated from the host computer system unless and until consumer information is received from the consumer computer system. By way of nonlimiting example, consumer information can include age, geographic location and/or mailing address, height, weight, breed (for when the health-related information includes veterinary health-related information), gender, health history and/or additional information.

The host computer system preferably communicates the consumer information to at least one advertiser associated with the health-related advertiser information. In some aspects, the host computer system is accessible from the waiting room of a medical facility or other publicly-shared computer station or other telecommunicative device. The host computer system, however, may be accessed from any location having a device capable of connective telecommunication with the host computer system.

Preferred embodiments of the apparatus aspects of the invention include a host computer system for hosting the health-related newsletter content and/or receiving content for the health-related newsletter from an advertiser computer system associated with the health-related advertising information, for example. In preferred embodiments, the host computer system hosts a first portion of the health-related newsletter content and receives a second content portion of the health-related newsletter, preferably from at least one advertiser computer system associated with the health-related advertising information. The host computer system preferably populates the health-related newsletter template with health-related newsletter content associated with the health-related advertising information to create an edition of the health-related newsletter. In preferred embodiments, the health-related newsletter content and the health-related advertising information may be identical or similar. In this respect, a consumer may see the same content on a computer display as appears on the sanitary paper which is exposed to the consumer.

The host computer system preferably populates the health-related newsletter template with dynamic health-related newsletter content in accordance with the code to create an edition of the health-related newsletter. The host computer system creates subsequent, updated editions of the newsletter by repopulating the health-related newsletter template with new dynamic health-related newsletter content in accordance with the code. Embodiments of the dynamic health-related content are preferably associated with the health-related advertising information. The host computer system preferably communicates another edition of the health-related newsletter to a consumer computer system where the consumer may "point and click" to print out the health-related newsletter.

Preferred embodiments of the invention include a method for targeted education and advertising. The method preferably includes disposing a consumer-friendly message on at least one of a plurality of portions of the media, preferably sanitary paper, where the consumer-friendly message includes health-related advertising information. The method also preferably includes disposing a URL, or functionally equivalent information, on at least one of the plurality of portions, where the URL is preferably associated with a host computer system hosting a health-related newsletter template.

The method preferably also includes disposing a code on at least one of the plurality of portions, where the code is preferably an alphanumeric representation associated with the health-related advertising information and health-related newsletter content. The sanitary paper or other medium is preferably then provided to a medical or other facility (such as a baby changing station in an airport or other public place) for display and usage thereat. In some embodiments of the method, the code is disposed within the URL. Some aspects of the method include perforating each of the sections with respect to each adjacent section and/or rolling the examination table sanitary paper. An association is preferably defined between the code and the health practice category of a medical facility in which the sanitary paper is located.

Preferred embodiments of the method include providing a host computer system and hosting the health-related newsletter content at the host computer system. In some aspects, the method includes receiving the health-related newsletter content at the host computer system from an advertiser computer system associated with the health-related advertising information and/or allowing the advertiser computer system to access the host computer system. In some aspects, the method includes hosting a first portion of the health-related newsletter content at a host computer, and receiving a second portion of the health-related newsletter content at the host computer system from at least one advertiser computer system associated with the health-related advertising information. In some aspects, the health-related newsletter template is populated with health-related newsletter content associated with the health-related advertising information to create an edition of the health-related newsletter, with plural, successive editions, differing from one another, being produced over time.

The host computer system preferably receives the code from the consumer. The code is preferably associated with at least one of the consumer friendly message, the health-related advertising information, a medical (or other) facility where the consumer-friendly message is displayed, a health practice category associated with the medical facility, an advertiser and/or other information. In some aspects, the health-related newsletter template is populated in accordance with the code to create an edition of the health-related newsletter. The edition of the health-related newsletter is preferably communicated to a consumer computer system. In some embodiments, the edition of the health-related newsletter will not be communicated to the consumer computer system until the host computer system receives the consumer information. In some aspects, the consumer information is communicated to an advertiser associated with the health-related advertiser information.

In some embodiments of the method, the health-related newsletter template is populated with dynamic health-related newsletter content in accordance with the code to create an edition of the health-related newsletter, while in some aspects, the health-related newsletter template is populated with dynamic health-related newsletter content in accordance with the code to create another edition of the health-related newsletter. The dynamic health-related newsletter content is preferably associated with the health-related advertising information. The another edition is preferably then communicated and/or automatically communicated to a consumer computer system.

Preferred embodiments of the invention include a method for targeted education and advertising including hosting a health-related newsletter template and receiving consumer information from a consumer at a host computer system designated by a URL, where the URL is displayed, preferably on the media and most preferably on a separate, tear-away portion of the media, at a medical facility in association with health-related advertising information. The method preferably also includes receiving from the consumer a code at the host computer system, where the code is displayed at the medical facility in association with the health-related advertising information, and populating the health-related newsletter template with health-related newsletter content selected in accordance with the received code to create a health-related newsletter. The method preferably includes communicating the health-related newsletter to the consumer, and communicating the consumer information to an advertiser associated with the health-related advertising information.

As the preferred media, sanitary examination table paper is preferably provided, and a plurality of sections are preferably delineated therein along the width of the paper. In some aspects, the plurality of sections are each perforatably attached along the delineations. The consumer-friendly message and an associated URL are preferably disposed on each of the plurality of sections with ink.

An examination table is provided preferably having a first end and a second end located longitudinally distally from the first end. A spool is preferably provided that is adapted for attachment to the examination table. The sanitary examination table paper is preferably rolled around the spool to create a paper roll, the paper roll is provided to a physician having a specialty, referenced herein as a "health practice category," and the examination table is placed in the physician's medical office or other medical facility. The paper roll is preferably attached to a first end of the examination table via the spool in a manner such that unrolling the paper roll towards the second end displays the section of the sanitary examination table paper containing the consumer-friendly message. At least one section of the sanitary paper is then unrolled toward the second end and the consumer-friendly message contained on the unrolled section is displayed to a consumer, such as a patient. The consumer preferably separates the section containing the consumer-friendly message and is permitted to take possession of the section and to take the section home. In some aspects, the section may contain an entertaining game, such as a crossword puzzle, for example. In preferred embodiments, the section contains an actual "tear and use" consumer coupon.

In some aspects, the method preferably includes hosting additional health-related advertising information on a first computer system associated with the URL address, receiving personal information at the first computer system from a patient who input personal information and the URL address into a patient computer system. Furthermore, the method preferably includes communicating the additional health-related advertising information to the patient computer system. The additional health-related advertising information is preferably related to the consumer-friendly message. The information is preferably targeted towards the patient based on at least one of (i) the content of the consumer-friendly message, (ii) the health-practice category for the doctor or other medical professional, (iii) the geographic location of the medical facility, (iv) consumer information, and/or (v) other information.

A medical professional's time is a valuable resource. Doctors, for example, spend a great portion of their day meeting and diagnosing patients, listening to the concerns and questions of consumers, e.g. patients, teaching proper compliance of newly prescribed medications and handling administrative matters, e.g. patient insurance, business matters, etc. Given the limited amount of time a medical professional has to accomplish these important tasks, the medical professional often provides a consumer with less than one hundred percent of the medical professional's attention, leading to an overworked and, in increasing instances, an underpaid/reimbursed physician.

Preferred embodiments of the invention relate to a way of improving initial communication between consumers and medical professionals and improving the availability and quality of follow-up information. Consumers should be the best health-educated advocate for themselves and those relying on them. Relying on a physician, doctor, nurse, dentist, veterinarian or other medical professional to fill the role of health advocate is becoming impractical in light of the burdened health industries.

In preferred embodiments of the invention, the physician or other medical professional can access the host computer system to obtain professional medical information associated with the health-related advertising information and the code. For example, a physician can access a web site with the URL shown on the sanitary paper, enter the code and then enter identifying medical professional information, such as an American Academy of Family Physicians membership code. Any medical professional can use the invention disclosed herein, not just physicians. References herein to a "physician," "physician computer system," etc., are made as examples of a medical professional, medical professional computer system, etc.

In some aspects, the invention includes a coordinated informationally coupled system for communication. The system preferably includes examination table sanitary paper, in some aspects rolled examination table sanitary paper, for use and display at a medical facility associated with a health practice category. The examination table sanitary paper preferably includes a plurality of sections and a consumer-friendly message disposed on at least one of the plurality of sections. The consumer friendly message preferably includes health-related advertising information corresponding to a health practice category. In some aspects, each of the plurality of sections has disposed thereon a copy of the consumer-friendly message. The health-related advertising information preferably includes at least one of human health-related advertising information and animal health-related advertising information. The health-related advertising information preferably includes commercial health-related advertising information, noncommercial advertising information, and/or a combination thereof.

In some aspects, the invention includes a second consumer-friendly message disposed on at least one of the plurality of sections not containing the consumer-friendly message, the second consumer-friendly message includes second health-related advertising information corresponding to the health practice category. In some aspects, the consumer-friendly message and the second consumer-friendly message are alternatively disposed on the plurality of sections. The invention preferably includes a consumer coupon redeemable for a discount on certain goods and/or services. The consumer coupon is preferably related to the health practice category associated with the sanitary paper or other medium. The consumer coupon can be removably attached to the examination table sanitary paper; in some aspects, the examination table sanitary paper includes the consumer coupon printed thereon, which is preferably detachable.

Each of the sections is preferably removably attached to each adjacent section. At least one of the plurality of sections is preferably distinguished from an adjacent one of the plurality of sections by a border which may be a perforation or a mark or a line or other suitable indicia. In some aspects, the examination table sanitary paper includes at least one of wet crepe table paper and glazed table paper. The consumer-friendly message is preferably printed on the examination table sanitary paper with non-bleeding, and non-toxic, inks.

Embodiments of the invention are excellent for advertising at medical facilities, particularly in the offices of doctors and other medical professionals. The preferred medium, sanitary paper, is a basic necessity at medical facilities and other locations where sanitary characteristics are present. Examination table sanitary paper, specifically, is a product that needs to be continually replaced and is traditionally an added expense for the physician. However, the sanitary paper, consumer-friendly message with health-related advertising information, URL and code of the invention present an economic opportunity where the physician can reduce costs because the advertiser or other party would likely bear the financial cost in exchange for having prime advertising space in the medical facility to surround the consumer and physician with educational information. Furthermore, the deliverability of the sanitary paper to the medical facility is established through already trained and experienced pharmaceutical sales representatives, for example. The sanitary paper is easily re-orderable and distributed personally to the physician in their practice. Other methods of delivery are also contemplated. The consumer is appreciative, informed and inspired.

By strategically targeting the consumer in an exclusively captive area, such as a physician's examination room, the commercial or noncommercial advertiser has an optimum marketing opportunity while the patient awaits the physician. The consumer is presented with a comfortable platform on which to engage in dialogue with his/her physician. Embodiments of the present invention take advantage of this under-exploited market by strategically placing health-related advertising information in a frequently replenished medium. Follow-up communication is accessible through a user-friendly, network-based health-related newsletter, where an advertiser can, in some embodiments, have influence regarding the health-related newsletter content. A hyperlink or other link is preferably included from the host computer system and/or health-related newsletter to the advertiser's web site, which can provide the consumer with additional information concerning healthy living.

Preferred embodiments of the invention include a method of directing targeted information for an entity to consumers. The method of directing targeted information preferably includes the creation of a tangible medium having targeted information emanating from the entity, such that the targeted information is discernable by consumers having access to the medium. The method of directing targeted information preferably includes providing a visually discernable informational key on the medium for communicatingly connecting with a data processing system at a remote locale. The method of directing targeted information preferably also includes placing the medium in a locale frequented by persons to whom the entity is interested in targeting the information. The method of directing targeted information preferably also includes telecommunicatingly receiving inquiry communications at the remote locale from a person applying the informational key to an input device adapted for telecommunicative connection with the remote locale in response to application of the informational key. The method of directing targeted information preferably also includes causing an information laden template to be transmitted to the person for display in response to receipt of an electronic signal corresponding to the informational key at the remote locale.

In preferred embodiments of the method of directing targeted information, the template is periodically refreshed and replaced. In some aspects, the step of causing the information laden template to be displayed to the person on the input device, includes selecting one of a plurality of information laden templates to be displayed at the input device in response to receipt of a selected one of a plurality of visually discernable codes taken from the medium by the person and provided to said input device. The telecommunicative communication is preferably performed via the Internet.

In preferred embodiments of the method of directing targeted information, the medium is paper, however the medium may be plastic and/or another material. The medium is preferably separable into segments, with at least some of the segments having the information thereon. Preferably, at least some of the segments have the visually discernable informational key thereon.

Preferred embodiments of the method of directing targeted information include recording and maintaining the identity of the person making the telecommunicatively transmitted inquiry by applying the informational key to the input device. In some preferred embodiments, the method of directing targeted information includes changing the information laden template display to persons in response to receipt of the electronic signal. Changing the information laden template is preferably performed after a preselected number of hits by a particular person.

The method of directing targeted information preferably includes receiving second information, provided by the person, taken from the media, and applied by the person along with the informational key to the input device. In some aspects, the method of directing targeted information includes collecting second information from a plurality of persons, segregating and dividing the second information according to the code input by each one of the persons, and furnishing at least a portion of the second information to the entity for analysis and use.

Preferred embodiments of the invention also include an apparatus for targeted interactive information dissemination and gathering. The apparatus preferable includes a disposable print-bearing medium with a consumer-friendly message displayed as a unitary whole thereon. The apparatus preferably also includes a visually discernable informational key appearing on the medium and defining an available address of a host computer and a visually discernable code appearing on the medium and defining selected information to be made available to a person applying the key to a computing device and connecting with the host computer. Preferred embodiments of the invention include a host computer adapted for remote telecommunicating access through personal application of the visually discernable key to a computing device generating and transmitting to the host computer an electronic signal responsive to the key and having the code embedded thereon. The host computer preferably transmits, in responsive to receipt of the electronic signal, information to the computing device corresponding to the code for display to the person.

The medium is preferably paper, however the medium may also be plastic and/or another material. The paper medium is preferably separable into segments and at least some of the segments preferably have the information thereon. In preferred embodiments of the apparatus, at least some of the segments have the visually discernable informational key thereon and/or at least one of the plurality of visually discernable codes thereon.

Preferred embodiments of the host computer include a plurality of information laden templates available to be selectably displayed at the computing device to persons applying the key and code to the input device and connecting with said host computer. The medium is preferably medical examination table sanitary paper and the paper segments are preferably sized for seating support of patients of a given medical specialty. The visually discernable informational key is preferably a Universal Resource Locator that preferably appears on at least one the segments of the paper. In preferred embodiments of the apparatus, the segments of paper having a Universal Resource Locator displayed thereon are adjacent one to another.

BRIEF DESCRIPTION OF THE DRAWINGS

The accompanying drawings, which are incorporated in and form a part of the specification, illustrate aspects of the preferred embodiments of the invention and, together with the description serve to explain the principles of the invention. In the drawings:

FIG. 1c is an illustration of a preferred embodiment of sanitary paper associated with an obstetrics health practice category, with one portion of the sanitary paper being shown.

FIG. 4b is a second part of the flow chart of FIG. 4a.

DESCRIPTION OF THE PREFERRED
EMBODIMENTS AND BEST BODE KNOWN
FOR PRACTICING THE INVENTION

Figure 1A:
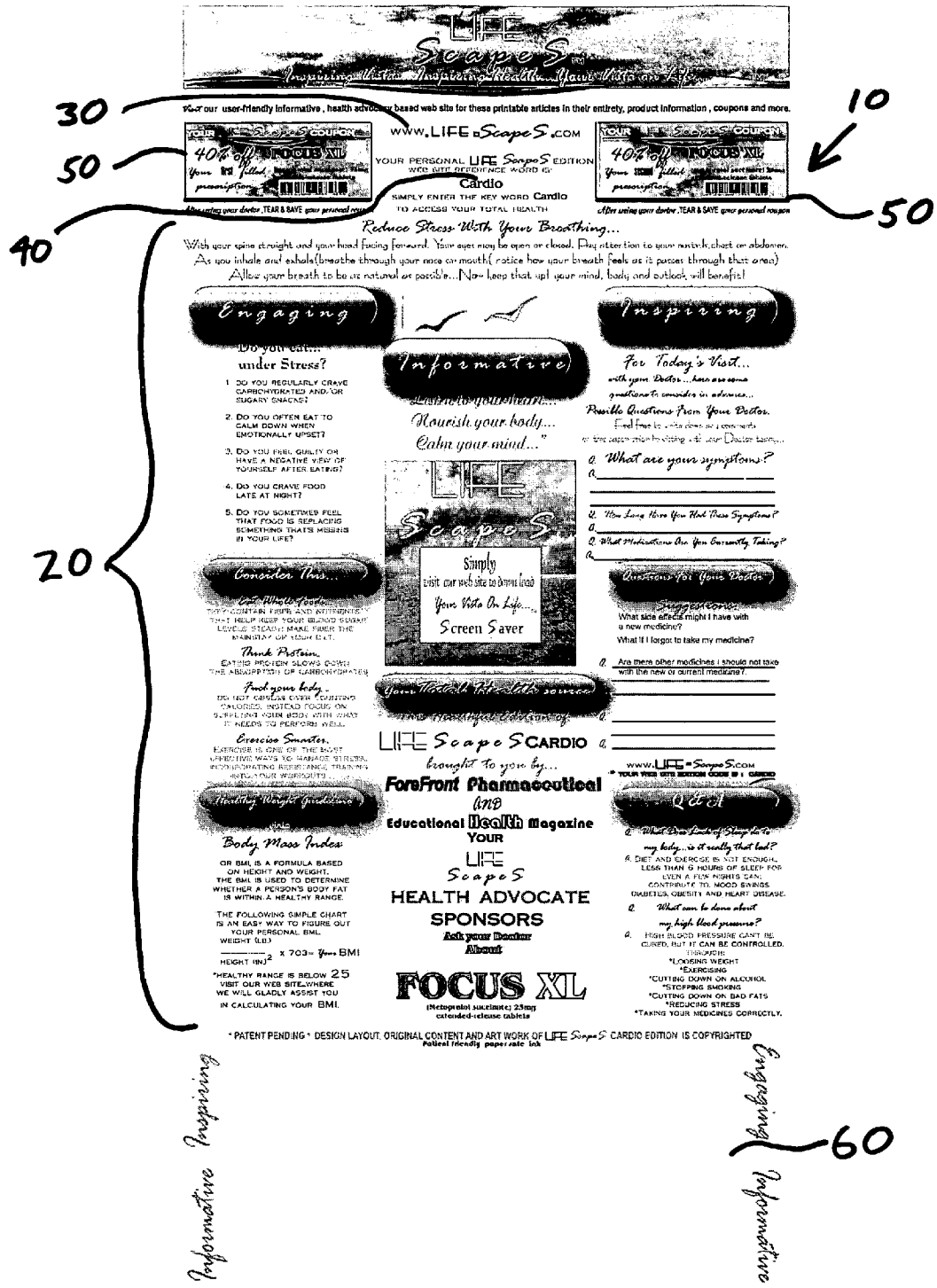
FIG. 1a is an illustration of a preferred embodiment of sanitary paper associated with a cardiology health practice category, with one portion of the sanitary paper being shown.

With principal reference to FIG. 1a, a preferred embodiment of sanitary paper is shown and designated generally 10. The preferred embodiment of sanitary paper 10 has disposed thereon a consumer friendly-message 20, a uniform resource locator (URL) 30, a code 40, at least one consumer coupon 50 and a seating area 60. Each of these will now be discussed in detail.

Sanitary paper 10 is preferably characterized as examination table sanitary paper and the plurality of portions of sanitary paper 10 are preferably characterized as sections of the examination table sanitary paper. The sections are preferably demarcated or otherwise delineated. However, the sections can also be perforated for easy separation. Each delineation and/or perforation is preferably along the transverse width of the examination table sanitary paper, which is preferably rolled around a spool adapted for attachment to an examination table. FIG. 1a shows a single portion of sanitary paper 10.

The rolled examination table sanitary paper is preferably attached to the first end of the examination table via the spool in a manner such that unrolling the paper roll towards a second end of the examination table displays a section of the sanitary examination table paper containing consumer-friendly message 20. In some embodiments of the preferred method, more than one section is displayed when sanitary paper 10 is unrolled. In some embodiments of sanitary paper 10, plain sheets of sanitary paper 10 may be interspersed with the sections of sanitary paper 10 having consumer-friendly message 20 disposed thereon. In some embodiments of sanitary paper 10, different consumer-friendly messages 20 are disposed on alternating or randomly positioned sheets of sanitary paper 10.

Any suitable type of sanitary paper 10 may be used, including for example, wet crepe paper and/or glazed paper. Each section of sanitary paper 10 preferably includes a seating area 60. It is preferred that sanitary paper 10 has a high tensile strength to minimize any risk that a consumer seated on seating area 60 will inadvertently tear sanitary paper 10. Specifically, it is foreseeable that a consumer sitting on an examination table, for example, would naturally be sitting on examination table sanitary paper 10 and might contort his or her body in order to view consumer-friendly message 20. This foreseeable event may lead to an inadvertent tearing of sanitary paper 10. Thus, a high tensile strength is preferred to minimize this risk.

Suitable specifications for sanitary paper 10 are shown below in Table 1, however, many other specifications are contemplated for the various embodiments of sanitary paper 10. It is known to those ordinarily skilled in the paper manufacturing industry how to achieve the suitable characteristics of paper as addressed in Table 1. Rolled examination table sanitary paper is preferably one hundred twenty-five (125) feet in length and has a width preferably between eighteen (18) and twenty-one (21) inches. The length of a section is preferably defined from demarcation-to-demarcation or perforation-to-perforation and is preferably between three (3) and five (5) feet.

TABLE 1

| Physical Characteristic | Test | Finished Product | | In-Process Reel | | Test Freq |
|---|---|---|---|---|---|---|
| | | Mean | Rejection Limit | Mean | Control Limit | |
| Basis Weight (lbs) | 1030 | 17 | 16.5-17.5 | — | 16.6-17.3 | 1 |
| Tear MD | 1625 | 30 | — | — | — | 4 |
| Tear CD | 1625 | 30 | — | — | — | 4 |
| ROLL CALIPER (1 ply) | 1103 | 3.2 | 3.0-3.4 | — | 3.0-3.3 | 1 |
| Dry Tensile MD | 1650 | 5.5 | 4.1 MIN | — | — | 1 |
| Dry Tensile CD | 1650 | 3.5 | 2.3 MIN | — | — | 1 |
| Stretch MD | 1650 | 1.4 | — | — | — | 1 |
| Wet Tensile MD | 1650 | 0.9 | — | — | — | 4 |
| Wet Tensile CD | 1650 | 0.6 | — | — | — | 4 |
| Moisture | computer | 4.5 | 4.0-5.0 | — | — | 1 |
| Brightness | 1075 | 85 | 75 Max | — | — | 6 |
| Dirt Count (ppm) | 1150 | 0 | 5 MAX | — | — | As Req. |
| Holes | 1285 | 0 | ⅛" Max | — | — | As Req. |
| Fluorescence | 1280 | No Req. | — | — | — | As Req |

Continuing with principal reference to FIG. 1a, ink is preferably used to create consumer-friendly message 20, URL 30, code 40 and consumer coupon 50 on at least one of the plurality of sections, preferably on each of the plurality of sections. Sanitary paper 10 preferably holds ink without any significant amount of bleeding and has a high tensile strength. Consumer-friendly message 20, URL 30, code 40 and consumer coupon 50, collectively, are preferably repeated on each section of the examination table sanitary paper. In some embodiments, each section can contain a different consumer-friendly message 20, URL 30, code 40 and consumer coupon 50. Color ink can be used to print text and/or graphics on sanitary paper 10. Six-color printing is preferable, but not required.

FIGS. 2a through 2d show alternative embodiments of consumer-friendly message 20 disposed on sanitary paper 10. Consumer-friendly message 20 may include any suitable textual and/or graphical layout and each of FIGS. 2a through 2d show consumer-friendly message 20 having varying layouts. The substance of the health-related advertising information communicated by consumer-friendly message 20 preferably takes priority over the form—or layout—in which consumer-friendly message 20 is presented. The various layouts of consumer-friendly message 20 shown in FIGS. 2a through 2d are examples, and additional layouts are contemplated.

Preferred embodiments of the medium, such as sanitary paper 10, include other types of specialty paper, such as baby tray sanitary paper to be used at a diaper changing table or other diaper changing surface. Baby tray sanitary paper is useful at baby changing stations, for example. As discussed above, sanitary paper 10 preferably includes a plurality of portions of sanitary paper. In embodiments of sanitary paper 10 that are characterized as baby tray sanitary paper, the plurality of portions of sanitary paper 10 are preferably each a separate piece of baby tray sanitary paper with consumer-friendly message 20, URL 30, code 40 and consumer coupon 50 disposed on each separate piece.

Preferred embodiments of the methods disclosed herein do not necessarily require that the baby tray sanitary paper be displayed at a medical facility; the baby tray sanitary paper may, for example, be displayed at a baby changing station at a restaurant or an airport. However, the health-related advertising information on baby tray sanitary paper is preferably associated with the health practice category of pediatrics. As discussed herein, sanitary paper is a preferred embodiment of a medium on which a consumer-friendly message is disposed. Other mediums are contemplated.

Consumer-friendly message 20 containing the health-related advertising information is preferably disposed on at least one of the plurality of portions of sanitary paper 10. For purposes of this invention, a "consumer" is any individual exposed to and perceiving the consumer-friendly message, including but not limited to a patient. The term "consumer" includes at least one of patients, associates of the patients, owners of patients (when the patient is a pet or other animal, for example), parents of patients, children of patients, guardians of patients and/or any other individual that would view the consumer-friendly message.

Consumer-friendly message 20 is preferably a message that can easily be read and understood by a consumer. Incomprehensible and/or complex medical jargon is preferably absent from consumer-friendly message 20 in substantial amounts, and consumer-friendly message 20 preferably and primarily includes ordinary language, not large amounts of complex medical terminology known only to health professionals. Embodiments of consumer-friendly message 20 may include some amount of medical/specialist jargon, but preferably only in such a manner so that consumer-friendly message 20 can be easily understood by the non-specialist consumer. However, as discussed below in further detail with principal reference to FIG. 3b, the physician may access professional medical information associated with the health-related advertising information portion of the consumer-friendly message at the host computer system.

Embodiments of the health-related advertising information are creatively presented and designed to subtly present inspiring perspectives incorporating current health-related topics, preferably relating to the health practice category associated with the medical facility in which sanitary paper 10 is displayed. Preferred embodiments of consumer-friendly message 20 include messages that inspire the consumer, outline newsworthy health issues and products, and promote open and healthy communication between the consumer and physician. The literary style of the consumer-friendly message is presented such that the advertiser associated with the health-related advertising information comes across to the consumer as a concerned sponsor/advocate for the overall health and well being of the consumer or patient. Some embodiments of the consumer-friendly message may be verbose, while others may be as concise as a slogan containing homeopathic content, such as "Take Charge of Your Life, Take Charge of Your Health."

While the majority of the health-related advertising information is preferably focused on communicating educational information, the health-related advertising information preferably also includes a commercial component. In some embodiments, the commercial component can be overt, focusing on characteristics of a product, for example. However, the commercial component is preferably subtle, only briefly mentioning a product name, corporate name, trademark and/or any other commercial indicia, for example. The relative amounts of educational advertising and commercial advertising information vary, depending upon the embodiment of consumer-friendly message 20. However, the goal of the preferred embodiment is to freely educate the consumer with the health-related advertising information.

Continuing with principal reference to FIG. 1a, URL 30 is preferably disposed on at least one of the plurality of portions of sanitary paper 10. URL 30 is the address of a resource available on an electronic network. By way of nonlimiting example, URL 30 can include a domain name, a sub-domain name, a pathname, and/or another hierarchical description of a file location or representation of information identifying a resource accessible on an electronic network. By way of nonlimiting example, such resources include web pages, such as an HTML page, image files, applets, computer programs, such as common gateway interface, and/or other resources. URL 30 can include information to be passed to the host computer system and is not limited to address information. URL 30 is associated with a host computer system that preferably hosts a health-related newsletter template and that, more preferably, hosts an edition of the health-related newsletter for consumer viewing, saving and/or printing.

Code 40 is disposed on at least one of the plurality of portions of sanitary paper 10. Code 40 is associated with the health-related advertising information and health-related newsletter content disposed on sanitary paper 10. Code 40 is preferably an alphanumeric representation. Code 40, on sanitary paper 10, is preferably chosen in association with the health-related advertising information, the health practice category, and/or another identifying characteristic of the embodiment of sanitary paper 10. As a nonlimiting example, if the health-related advertising information relates to chemical depression or an advertised pharmaceutical product for treatment of chemical depression, code 40 would preferably be chosen so that it is associated with health-related newsletter content relating to chemical depression, treatment of chemical depression, related pharmaceutical products, etc. In this example, the word "depression" could be chosen as code 40.

Figure 1B:
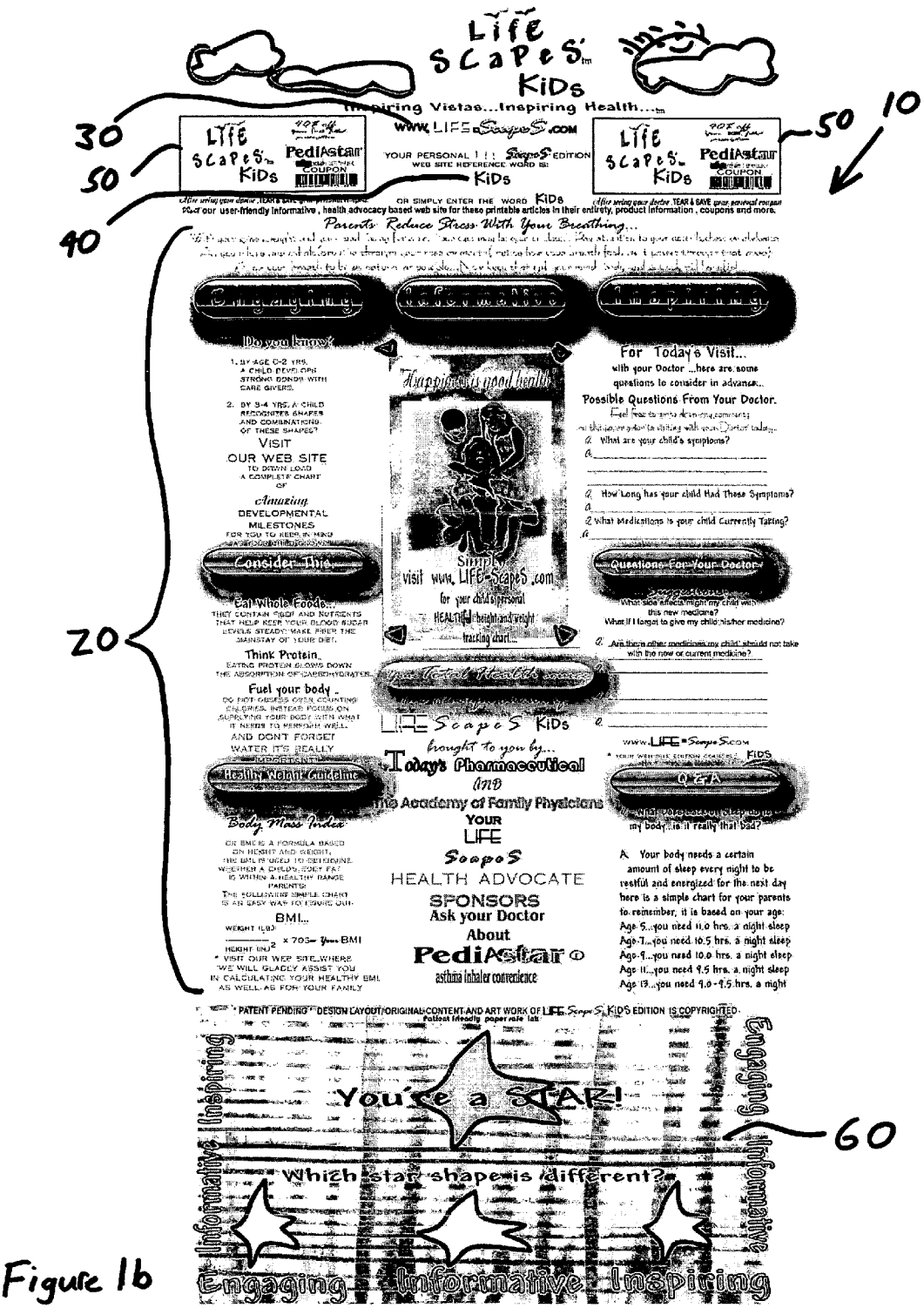
FIG. 1b is an illustration of a preferred embodiment of sanitary paper associated with a pediatric health practice category, with one portion of the sanitary paper being shown.
Figure 2A:
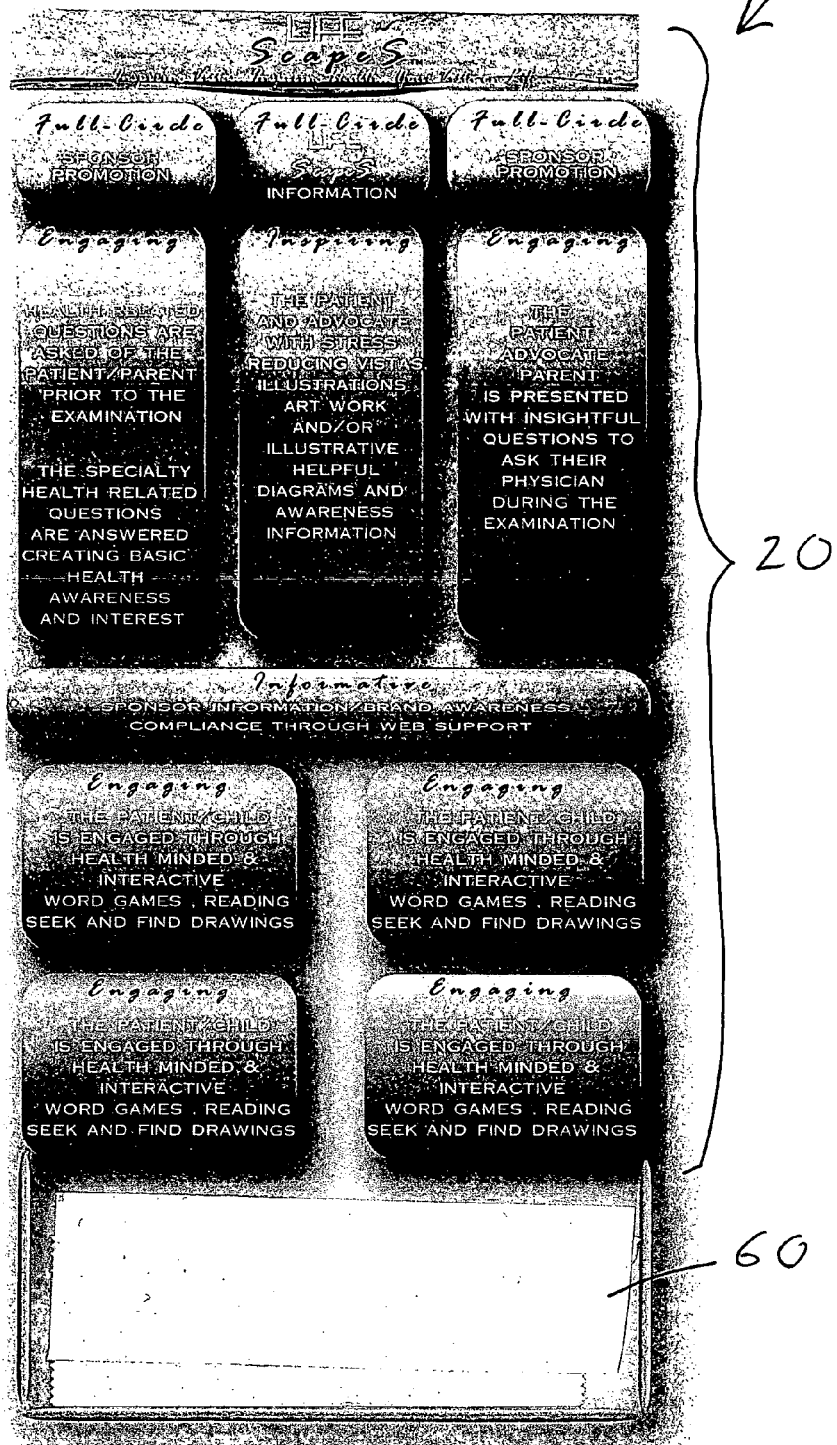
FIG. 2a is an illustration of sanitary paper having a consumer-friendly message on a portion thereof.
Figure 2B:
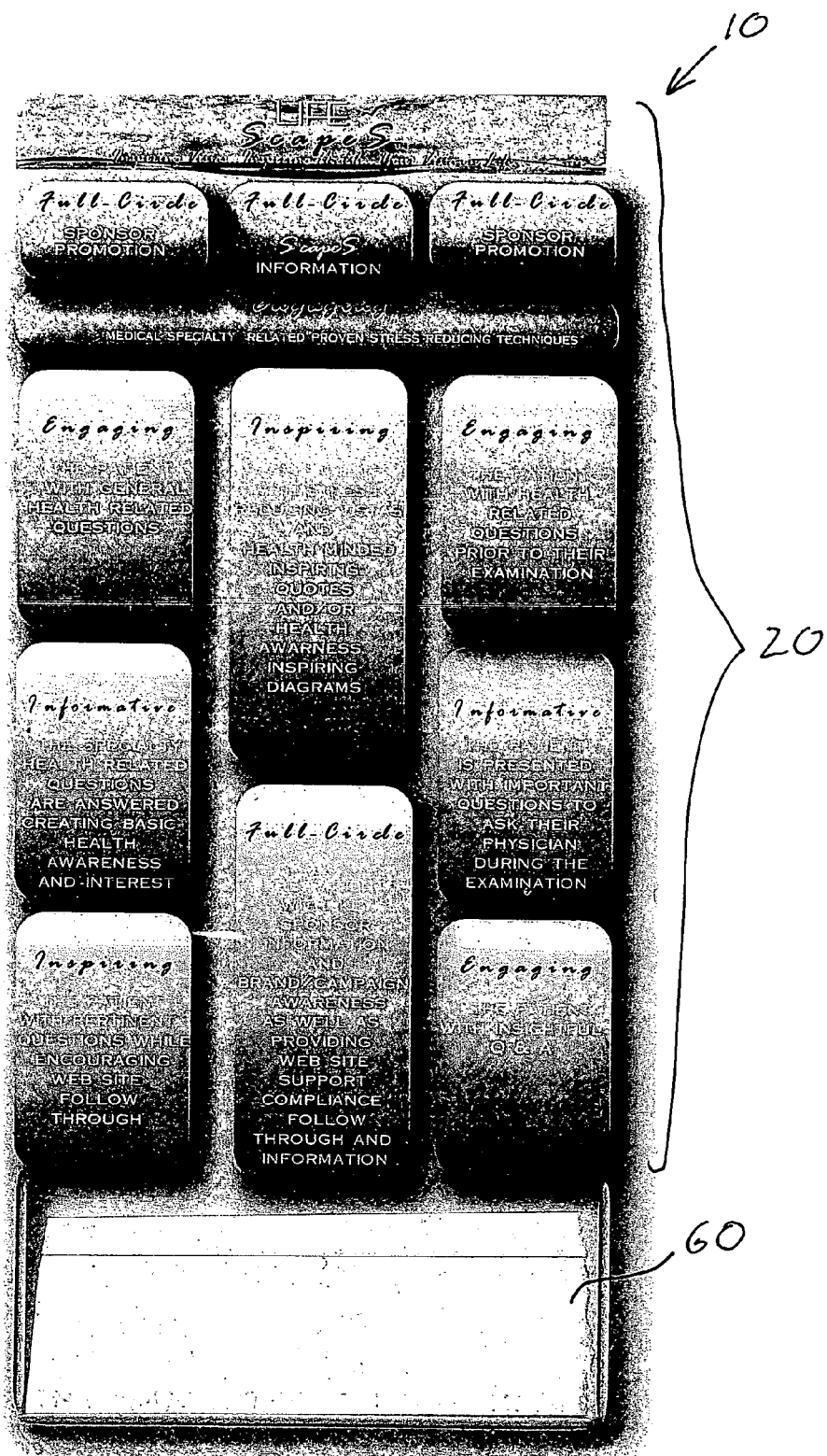
FIG. 2b is an illustration of sanitary paper having another consumer-friendly message disposed on a portion thereof.
Figure 2C:
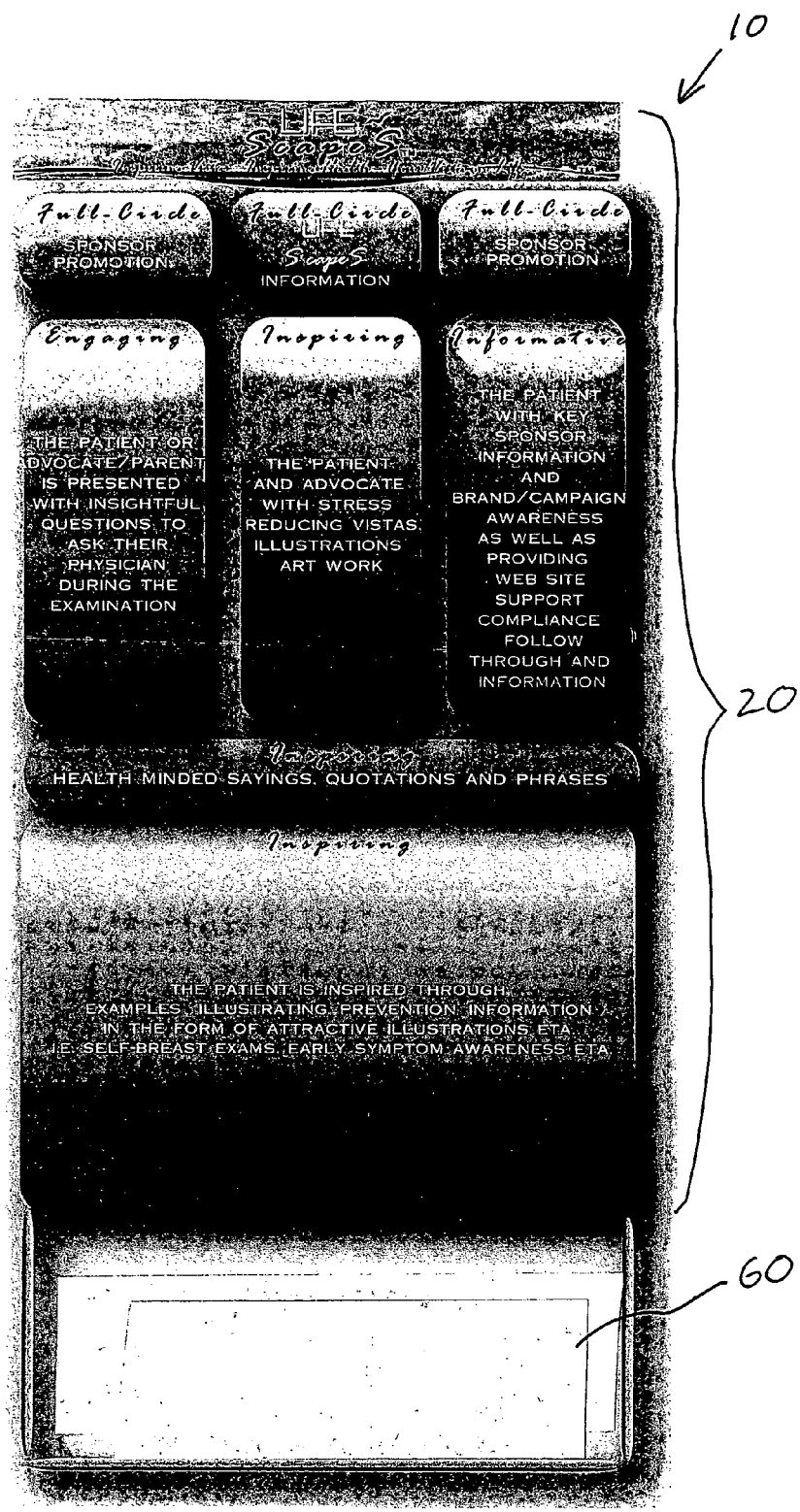
FIG. 2c is an illustration of sanitary paper having yet another consumer-friendly message disposed on a portion thereof.
Figure 2D:
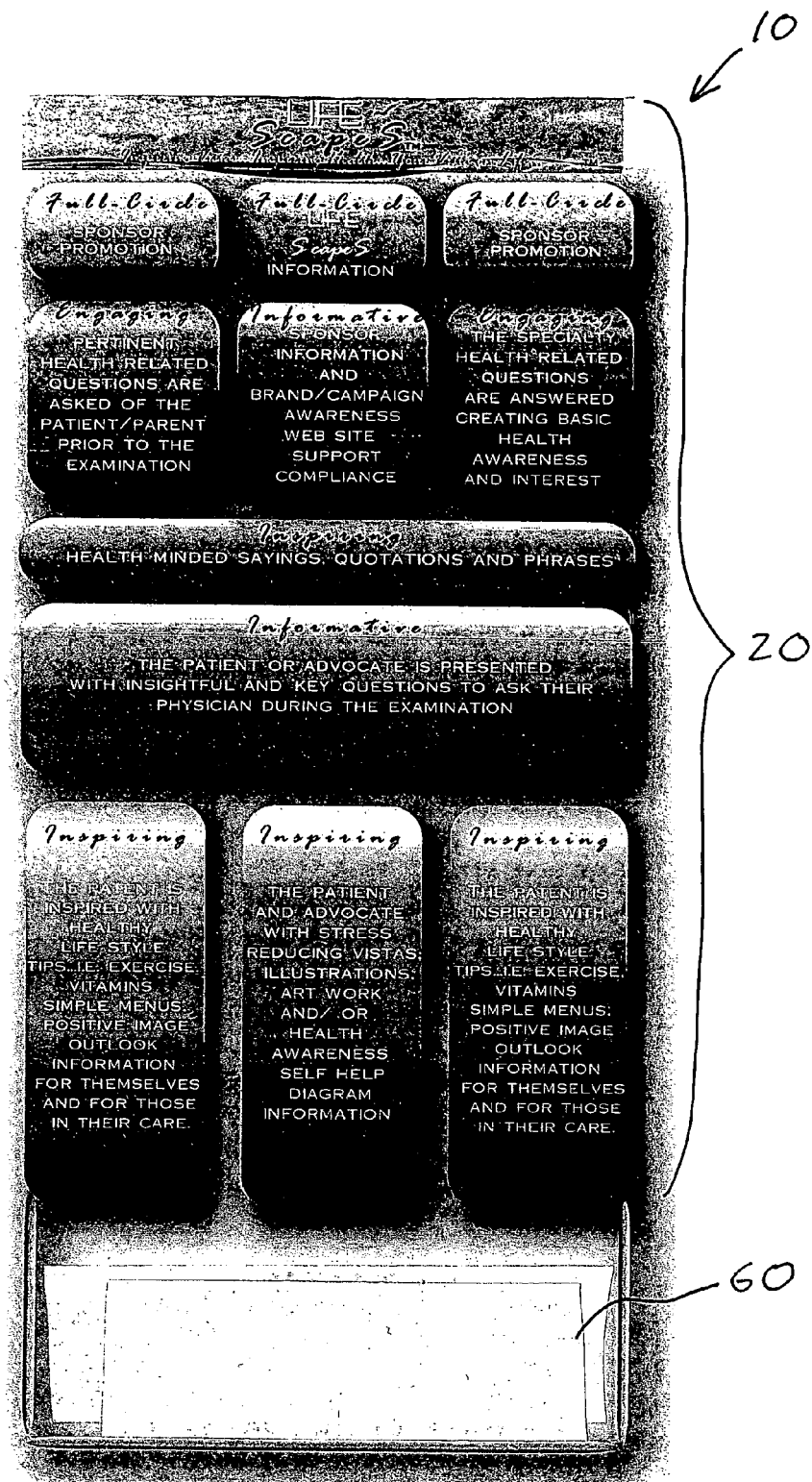
FIG. 2d is an illustration of sanitary paper having still another consumer-friendly message disposed on a portion thereof.

With principal reference to FIGS. 1a through 1c, multiple codes 40 can be used for a plurality of sanitary papers 10, each of the plurality of sanitary papers 10 having health-related advertising information associated with different diseases, illnesses, health products, etc. corresponding to different codes 40. For example, FIG. 1a shows health-related advertising information tailored for a cardiology consumer and code 40 is "cardio." FIG. 1b shows health-related advertising information tailored for a pediatrics consumer and code 40 is "kids." FIG. 1c shows health-related advertising information tailored for an obstetrics consumer and code 40 is "obgyn." As discussed below in further detail, the host computer system preferably maintains an association between code 40 and the health-related advertising information, thus allowing the consumer to enter code 40 upon accessing the host computer system to obtain further information relevant to the health-related advertising information and the relevant medical specialty. In preferred embodiments, the consumer can use code 40 to obtain an electronic replica of consumer-friendly message 20 associated with code 40.

Code 40 preferably includes characters, such as alphanumeric characters, for example. Code 40 most preferably may be a human-perceptible word, such as ASPIRIN or CARDIO or a string of characters to be interpreted by a computer, e.g. 3ASPRN57. Though not shown in the drawings, in some embodiments of the invention, URL 30 may include code 40 as a portion thereof, such as where code 40 is a subdomain or path name. A sample subdomain is ASPIRIN.HEALTHYNEWSLETTER123.COM and a sample path name is HEALTHYNEWSLETTER123.COM/ASPIRIN.HTML. In some embodiments, code 40 may be in bar code format and/or another machine-readable format.

Code 40 is preferably associated with consumer friendly message 20, the health-related advertising information, and a health practice category associated with consumer-friendly message 20. Code 40 can also be associated with the medical facility in which sanitary paper 10 is displayed, a commercial advertiser providing the health-related advertising information, an educational content advertiser of the health-related advertising information, etc.

To this end, sanitary paper 10 can be tagged so that, after a consumer sees code 40 and submits it to the host computer system, code 40 will identify information associated with sanitary paper 10. As a nonlimiting example, NJ-RSKCRDC-FP could be used as a code 40 to indicate that the associated health-related advertising information addresses the risks of cardiac disease, that sanitary paper tagged with the code NJ-RSKCRDC-FP was used in New Jersey and that the health practice category is "family practice." In this respect, the code chosen for a specific roll of sanitary paper 10 can be unique to the specific roll. Some embodiments of the method of this invention include generating a suitable code 40.

Continuing with principal reference to FIG. 1a, preferred embodiments of sanitary paper 10 include at least one consumer coupon 50, such as a coupon redeemable for goods and/or services. The text of consumer coupon 50 is preferably printed directly on sanitary paper 10 and consumer coupon 50 is preferably detachable from the rest of the sanitary paper e.g. by ripping along a perforation, by ripping the paper itself, etc. In some embodiments, however, consumer coupon 50 can be removably attached to sanitary paper 10, such as by using a sticker-type coupon or by providing perforations between consumer coupon 50 and consumer friendly message 20.

Consumer coupons 50 are preferably redeemable for a discount on goods and/or services related to the health practice category. For example, in embodiments where the health practice category is chiropractic, consumer coupon 50 may be redeemed for a discount on a massage; where the health practice category is cardiovascular disease, consumer coupon 50 may be redeemed for a trial sample of a new heart medication; and where the health practice category is a general practice health topic, such as healthy eating, then consumer coupon 50 may be redeemed for literature on better living, such as literature discussing how to eat better.

Preferred embodiments of the invention include a host computer system storing a health-related newsletter template that can be populated with health-related newsletter content to create an edition of a health-related newsletter. In object-oriented programming, for example, embodiments of the health-related newsletter template are a unit of source code used for instantiating specific editions of the health-related newsletter that each contain specific health-related newsletter content. Object-oriented programming (OOP), for example, comprises programming language models organized around "objects", rather than "actions", and around data rather than "logic".

Host computer systems are well known in the art, and can include any suitable combination of the following hardware components: servers; processors; at least temporary memories; communications devices; displays; user inputs, e.g. keyboard, mouse, etc.; removable recording media devices and other hardware components. The host computer system preferably stores program code to implement aspects of the methods described herein and/or is adapted to receive program code from removable media, e.g. floppy discs, compact discs, etc., from programmed hardware, from across a network, and/or from other sources. Herein the term "host computer system" is used in its broadest sense and includes one or more computers. Some embodiments of the host computer system are distributed. For example, the components of the host computer system need not be in close physical proximity to one another, so long as the components of the host computer system are in suitable electrical communication with one another.

The host computer system preferably provides a health-related web site accessible over an electronic network by consumers, medical professionals and advertisers. A consumer can preferably access the health-related newsletter by following a consumer link from the home page of the health-related web site, where the consumer is prompted to enter certain information to gain access. At the same time, a medical professional can preferably access professional medical information by following a medical profession link from the home page of the health-related web site, where the medical professional is prompted to enter certain information to gain access. These two paths are discussed in further detail below with principal reference to FIGS. 3a and 3b, respectively. In preferred embodiments, advertisers and potential advertisers can also access the health-related web site by following an appropriate link from the home page of the health-related web site. Additional methods of accessing the host computer network are contemplated and discussed below with principal reference to FIGS. 4a and 4b.

Figure 3A:
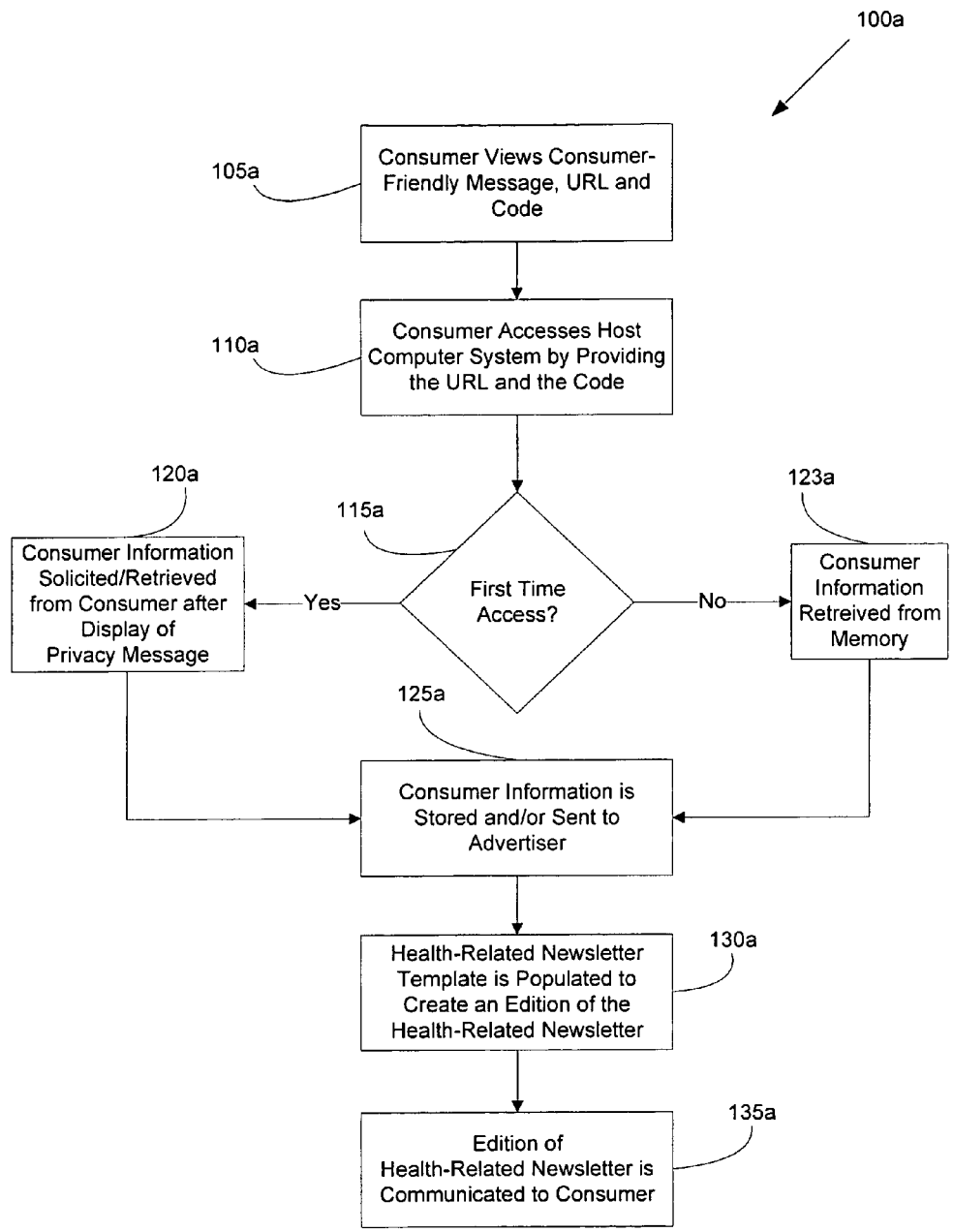
FIG. 3a is a flow chart showing a preferred method for a consumer to access a desired health-related newsletter.

With principal reference to FIG. 3a, a flow chart designated generally as 100a shows a preferred method of consumer access to the health-related information on the host computer. At step 105a, the consumer views consumer-friendly message 20, URL 30 and code 40 on sanitary paper 10. As a nonlimiting example, consumer-friendly message 20 may display health-related advertising information relating to asthma, display the URL "HEALTHYNEWSLETTER123.COM" and display the code "INHALE." The consumer remembers this information for prospective entry into a consumer computer system, for example. In some embodiments of the invention, examination table sanitary paper includes a plurality of sections. In this respect, the consumer can tear off a section of examination table sanitary paper and take it home for future reference to the information. The consumer can also enter URL 30 and code 40 into a portable electronic device, such as a PDA, in communication with a network, while in the examination room of a medical facility awaiting treatment.

At step 110a, the consumer accesses the host computer system preferably using a consumer computer system. Any network connected computer system suffices as a consumer computer system so long as it facilitates access to the host computer system. Depending upon the embodiment, the consumer computer system can include, for example, a networked home computer system, networked cell phone, networked PDA, etc. The consumer enters URL 30 at the consumer computer system to retrieve the home page, for example, of the health-related web site, where the consumer preferably then enters the code to obtain access to the health-related newsletter. At step 115a, the host computer system preferably determines whether the consumer has previously visited the health-related web site, and if not software of the host computer effectuates transition to step 120a. At step 120a, the host computer system displays a privacy message and solicits consumer information from the consumer. At step 115a, the host computer system preferably uses cookies and/or another suitable identification method known in the art. If the consumer has previously visited the health-related web site, then the consumer information is retrieved from memory at step 123a. Preferred embodiments of the invention are compliant with the Health Insurance Portability and Accountability Act (HIPAA) and do not elicit, obtain or provide consumer information absent required, affirmative consent from the consumer, patient, guardian and/or other suitable party.

The solicited consumer information may often times, but not always, be motivated by survey, polling, demographic, marketing and/or other concerns, and is preferably passed to the commercial and/or noncommercial advertiser. At step 125a, after consumer information is retrieved (either from the consumer at step 120a or from memory at step 123a), the consumer information is preferably stored and/or transmitted to the advertiser to indicate an instance of access to the host computer by the consumer. The indicator of access is preferably transmitted along with code 40 entered by the consumer to provide further market data for future analysis by commercial and noncommercial advertisers. Thus, consumer information preferably provides key marketing or other information to the advertiser with the consumer's knowledge and consent in exchange for the health-related newsletter in a conventional mail format, an electronic mail format and/or a customized portal or electronic magazine format.

Continuing with principal reference to FIG. 3a, at step 130a the host computer system populates the health-related newsletter template with health-related newsletter content to create an edition of the health-related newsletter. The health-related newsletter template is preferably content-neutral and the health-related newsletter content is preferably selected in accordance with code 40 provided by the consumer, which is associated with the health-related advertising information shown on sanitary paper 10. Although it is shown in FIG. 3a that template population preferably occurs at step 130a after the consumer obtains access, in some embodiments of the method, population of the template to create the health-related newsletter occurs prior to consumer access.

Continuing with reference to step 130a, the edition of the health-related newsletter can cover topics of information frequently omitted by doctors due to time constraints, for example. A monthly edition, for example, of a health-related newsletter is preferably a user-friendly "edu-tainment"

styled healthy living tips newsletter. Preferred embodiments of the health-related newsletter template can be used for any combination of varying sub-templates, such as for example, article templates, forum templates, column templates, advertisement templates, notes templates, editorial templates and/or other templates. In the case of a health-related newsletter template having health-related newsletter sub-templates, each of the health-related newsletter sub-templates are preferably populated with health-related newsletter content to create an edition of the health-related newsletter. The health-related newsletter content is preferably selected in accordance with code 40 entered by the consumer, so as to customize the health-related newsletter to match health-related advertising information presented in consumer-friendly message 20. Some preferred embodiments of the health-related newsletter are replicas of a particular consumer-friendly message 20. Other preferred embodiments of the health-related newsletter contain health-related newsletter content having drug compliance information such as when to take a drug, what drugs should not be mixed, etc. Other health-related newsletter content is contemplated.

At step 135*a*, the edition of the health-related newsletter is communicated to the consumer. The host computer system preferably transmits the edition of the health-related newsletter over a network to the consumer computer system. Moreover, an individual associated with the host computer system may mail a print-copy of the edition of the health-related newsletter to an address provided by the consumer, e.g. traditional mail via the United State Post Office. The edition of the health-related newsletter can also be transmitted to the consumer via electronic mail, for example. The host computer system can also make available an edition of the health-related newsletter in a customized portal and/or an electronic magazine format.

The health-related newsletter template can be subsequently populated with additional health-related newsletter content to create another edition of the health-related newsletter, which is preferably then automatically communicated to the consumer computer system from the host computer system. In preferred embodiments, the edition of the health-related newsletter contains links to sites having related information or more detailed information, e.g. health clinics, information sources, etc. The edition of the health-related newsletter may also contain electronic consumer coupons for related services that can be downloaded for printing and use/redemption. Thus, as new health-related newsletter content becomes available, additional editions of the health-related newsletter are preferably transmitted to the consumer from the host computer system.

Figure 3B:
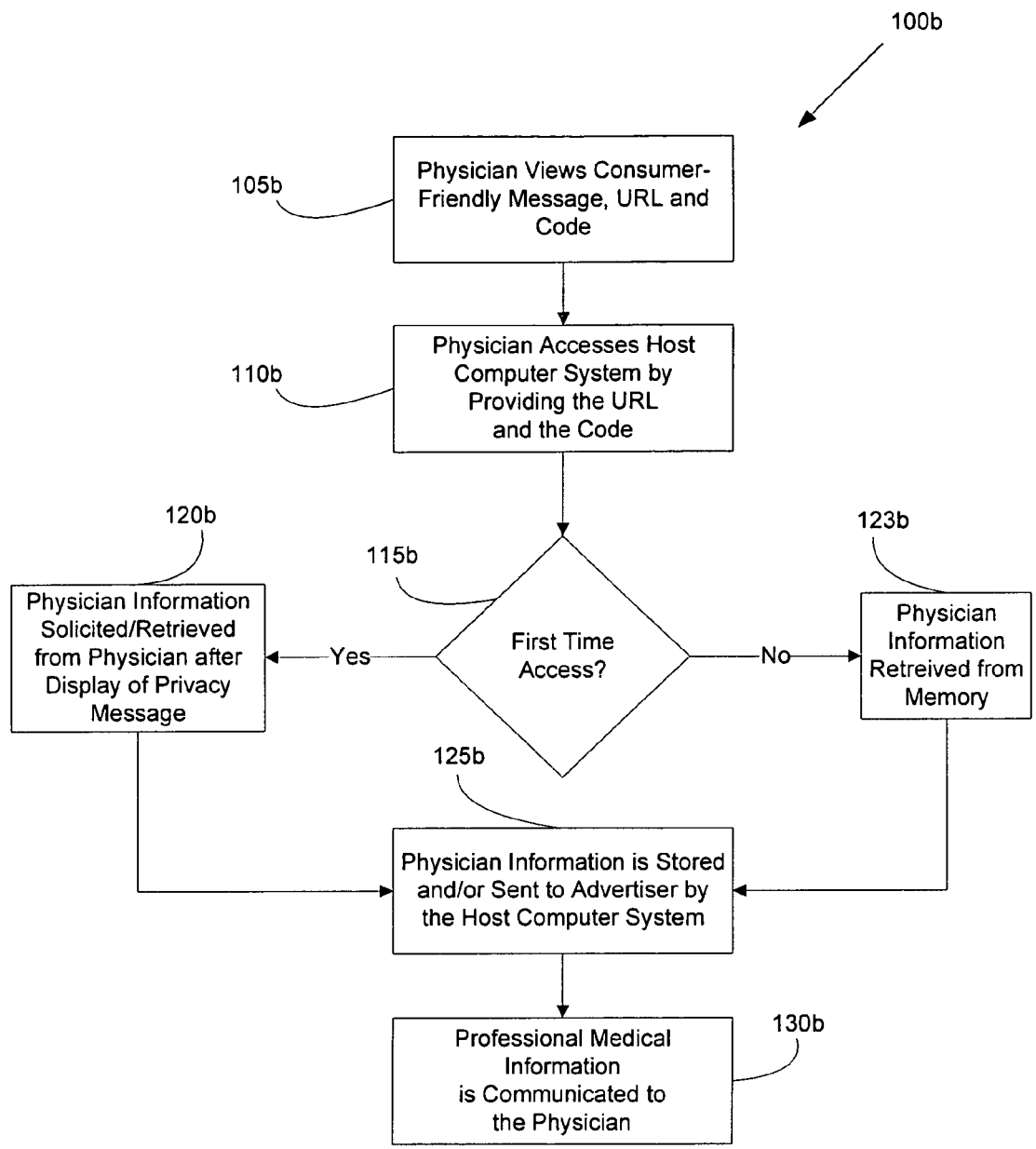
FIG. 3b is a flow chart showing a preferred method for a medical professional, such as a physician, to access desired professional medical information.

FIG. 3*b* shows a preferred method of home page access of the health-related web site by a medical professional, designated generally as 100*b*. Although access by many types of medical professionals is contemplated, access by a general or family practice physician is discussed herein for the purposes of clarity.

At step 105*b*, the physician views a section of sanitary paper 10 and thus perceives consumer-friendly message 20, URL 30 and code 40. At step 110*b*, the physician or other medical professional accesses the host computer system preferably using a medical professional computer system. Any networked computer system suffices as a medical professional computer system so long as it facilitates access to the host computer system. The physician enters URL 30, which preferably retrieves the health-related web site, where the physician preferably enters the code to obtain access. At step 115*b*, the host computer system preferably identifies whether the physician has previously visited the health-related web site, and if not, at step 120*b*, the host computer system displays a privacy message and solicits physician information from the physician. By way of nonlimiting example, physician information can include the physician's membership code with an organization, such as the American Academy of Family Physicians or other desired information. If the physician has previously visited the health-related web site, then information for that particular physician is preferably retrieved from memory at step 123*b*. The host computer system preferably identifies the physician computer system by using cookies or another suitable method known in the art.

After physician information is retrieved at either step 120*b* or step 123*b*, the physician information is preferably transmitted to the advertiser at step 125*b* to indicate an instance of physician access. The transmission is preferably transmitted along with code 40 entered by the physician to provide further market data for future marketing analysis by commercial and noncommercial advertisers, for example. In this respect, physician information preferably provides key marketing information to the advertiser with the physician's knowledge and consent in exchange for the professional medical information.

At step 130*b*, the host computer system provides the physician with professional medical information in the health practice category associated with code 40. The professional medical information is tailored towards a professional readership and preferably includes both educational advertising content and commercial advertising content. The physician can preferably also access the health-related newsletter without having to re-enter the health-related web site.

Although not shown in the figures, some embodiments of the invention can include the preliminary step of preparing sanitary paper 10. This preferably involves developing the health-related advertising information, developing the health-related web site, creating the domain name, creating code 40, creating URL 30, and creating the associations and relationships between URL 30, code 40 and the health-related advertising and other information. Furthermore, some embodiments of the invention can include the manufacture of sanitary paper having information disposed thereon with the relationships and associations discussed herein. Some embodiments of the invention can include providing the sanitary paper to a medical facility associated with a health practice category corresponding to the code on the provided sanitary paper.

Figure 4A:
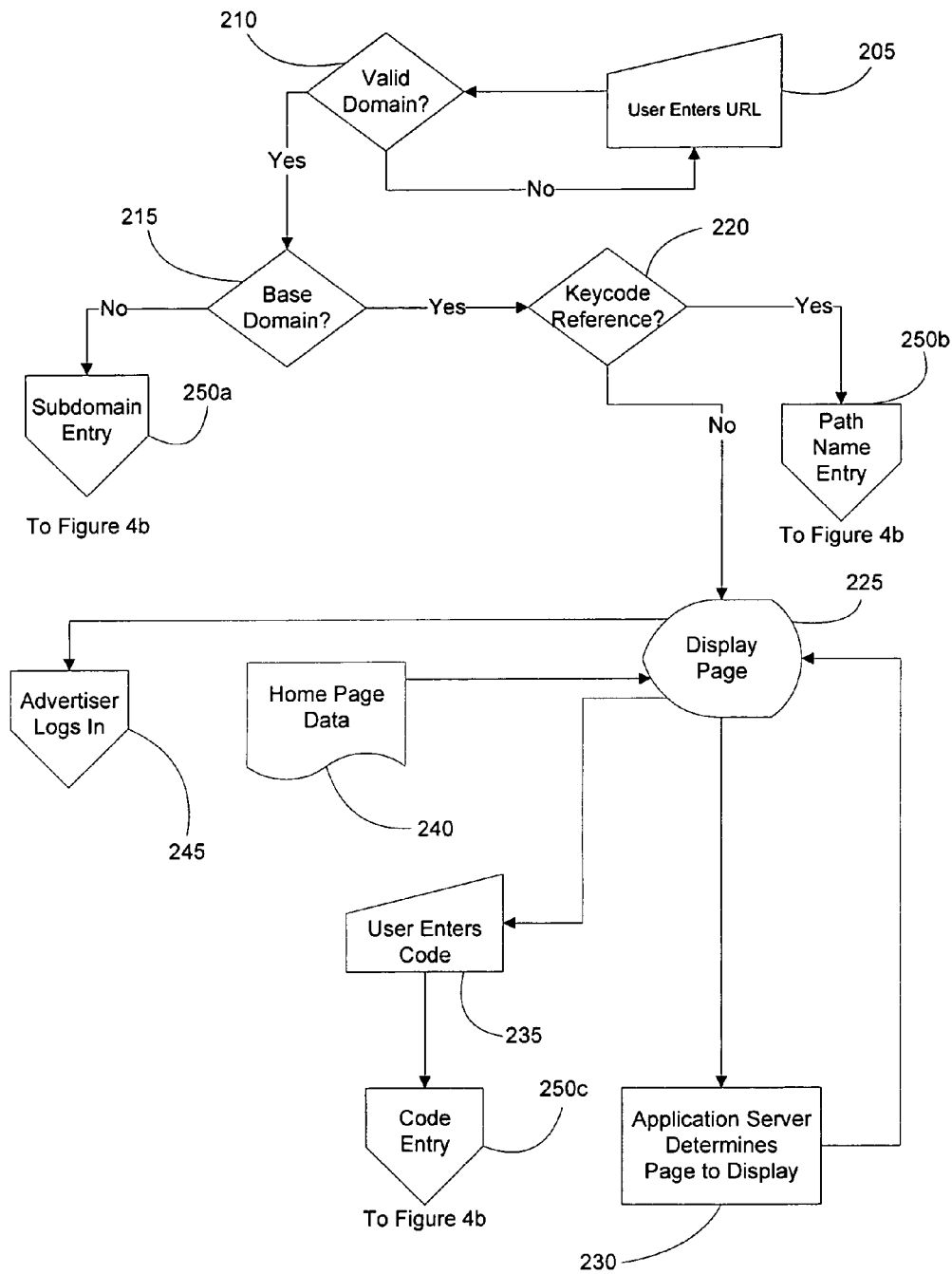
FIG. 4a is a first part of a flow chart further showing preferred methods for accessing a desired health-related newsletter or professional medical information.
Figure 4B:
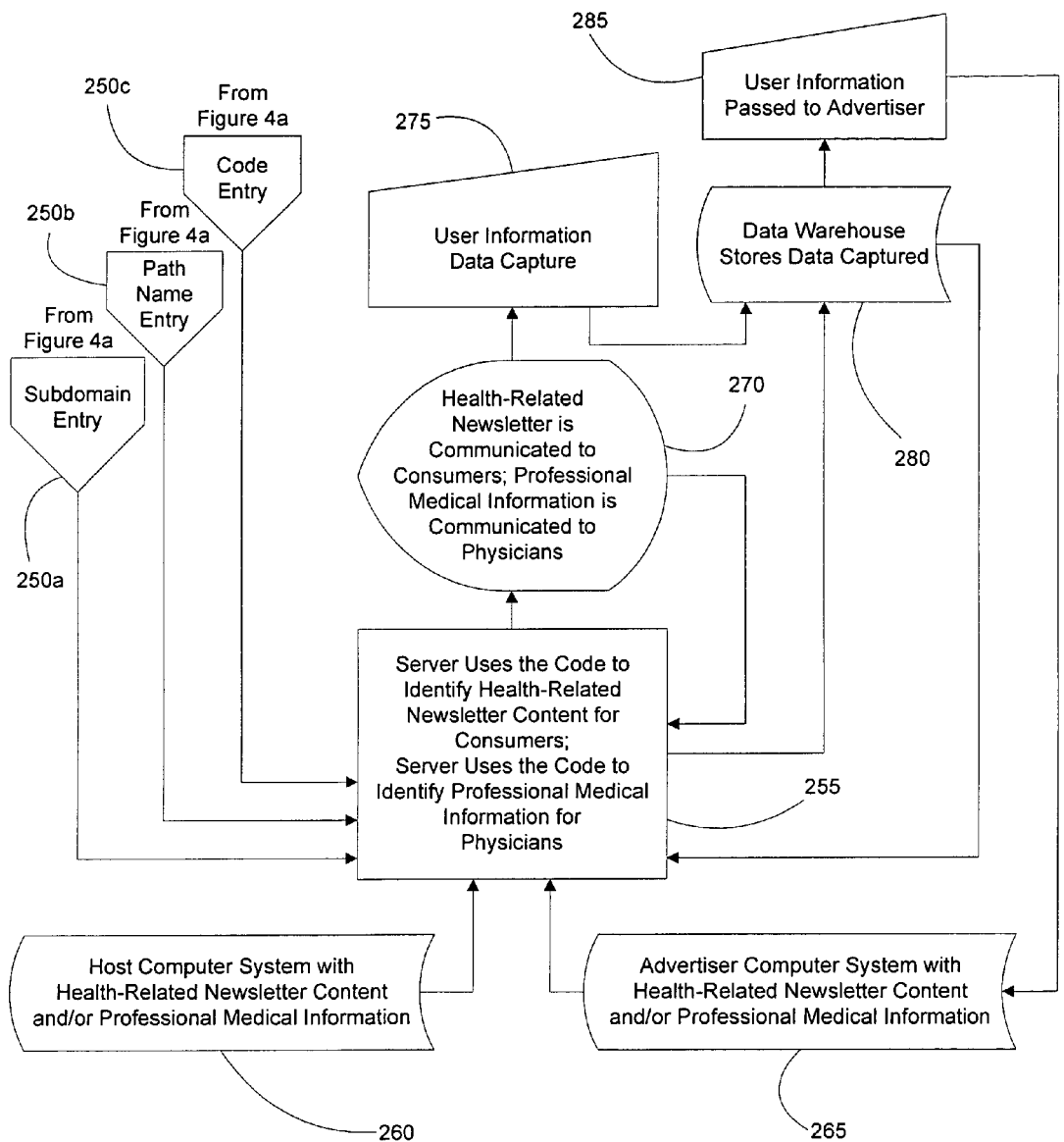

With principal reference to FIG. 4*a* and FIG. 4*b*, consumers and physicians can access health-related newsletters and professional medical information, respectively, in any number of ways. For example, a consumer and/or physician can use a base domain, such as HEALTHNEWSLETTER123.COM, a subdomain, such as ASPRIN.HEALTHYNEWSLETTER123.COM, or a path nane, such as HEALTHYNEWSLETTER123.COM/ASPIRIN.HTML to access the health-related web site. Advertisers can also log-in to the health-related web site and obtain consumer information about consumers and physician information from physicians.

A sample communications method will now be discussed, however additional communication methods are contemplated. References made below to "users" denote consumers and/or physicians. As discussed above, "advertisers" denote commercial advertisers and/or unpaid educational content sponsors or other noncommercial advertisers.

With principal reference to FIG. 4*a*, at step 205 a user preferably enters a URL, such as URL 30, into a browser of the consumer computer system or medical professional computer system. Such users might include, for example, a consumer attempting to access the health-related web site using a consumer computer system or a physician or other medical professional attempting to access the health-related web site using a medical professional computer system. Once it is determined at step 210 that the URL includes a valid domain name, then the host computer system, at step 215, determines if the domain name is a base domain name, e.g. HEALTHYNEWSLETTER123.COM. If the URL includes a sub-domain name, e.g. ASPIRIN.HEALTHYNEWSLETTER123.COM, then the host computer system recognizes the subdomain, e.g. "ASPIRIN", as code 40 and proceeds to login at step 250a. In the event the URL only contains a base domain name and is free of a subdomain name, then the host computer system determines at step 220 whether the domain name includes the code within the URL as part of the path name, e.g. HEALTHYNEWSLETTER123.COM/ASPIRIN.HTML. If the code is identified as part of the path name, then the host computer system permits the consumer to login at step 250b.

Continuing with principal reference to FIG. 4a, when the URL does not include an encoded subdomain, path name or other encoded information, the host computer system, at step 225, preferably transmits the home page data 240 of the health-related web site for display to the consumer computer system (or the medical professional computer system). The host computer system preferably hosts or otherwise makes available at least some publicly accessible information that does not require a code, such as code 40, for access. As the user navigates through any publicly accessible information, the host computer system determines the page to display at step 230 and displays the page at step 225. In some aspects, this page data is cached data. In preferred embodiments of the health-related web site, a user can click on links to incorporate framed pages, for example, the content of which is retrieved from an advertiser computer systems, for example, and transmitted to the consumer computer system for display at step 225.

From the home page or other page display at step 225, the user can enter the code at step 235 by clicking an appropriately labeled link, button, etc. on the health-related web site. As discussed above, the code can include code 40 or any other code associated with the health-practice category corresponding to sanitary paper 10. After entry of the code, the host computer grants access to the user at step 250c.

A commercial and/or noncommercial advertiser can also access the health-related web site by logging in at step 245. The advertiser can thus administer the health-related newsletter and the professional medical information. The advertiser can also choose from various layout options for consumer-friendly message 20 and/or the health-related newsletter template. As shown in FIG. 2a through FIG. 2d, for example, various layout options are available and it is not required that a layout option be specific to a health-practice category. However, each layout option preferably includes some type of "Q & A" section for enticing the consumer to visit the health-related web site.

With principal reference to FIG. 4b. once access has been obtained by subdomain entry 250a, path name entry 250b, or code entry 250c, then the host computer system, at step 255, identifies the health-related newsletter content corresponding with the code inputted by the consumer. Where the user is a physician, the host computer system, at step 255, identifies professional medical information corresponding with the code entered by the physician. Content preferably originates from the host computer system and/or advertiser computer system, which is provided at step 260 and step 265, respectively. At step 270, the host-computer system transmits the health-related newsletter to a consumer and/or transmits the professional medical information to the physician.

In some embodiments, the consumer may desire to repopulate the newsletter template with additional or alternative content, in which case the host computer system preferably repopulates at step 255. As a nonlimiting example, the consumer can later obtain another edition of the health-related newsletter, which is preferably accomplished by populating the health-related newsletter template with health-related newsletter content.

Continuing with principal reference to FIG. 4b, at step 275, the user is prompted to enter user information, including for example, information in response to various forms, questionnaires, promotions, etc. to capture survey data, preferably anonymous survey data, as well as user specific information and preferences. User information is referred to as consumer information when provided by a consumer. User information is referred to as medical professional information when provided by a medical professional, or by way of example, physician information when provided by a physician. In preferred embodiments, such as the embodiments shown in FIGS. 3a and 3b, consumer information and physician information can also be retrieved at an earlier point in the method, for example, as a prerequisite to communication of the health-related newsletter.

At step 280, the user information retrieved at step 275 is stored in a data warehouse that is preferably located at the host computer system. The user information may include, for example, any consumer information retrieved at steps 120a and 123a and/or the physician information retrieved at steps 120b and 123b. User information and any provided user preference are preferably saved to the data warehouse at step 280. In some aspects, user preferences are loaded from the data warehouse for a server to customize the display and other aspects of the user's web experience. At step 285, consumer information and/or physician information can be passed to the advertiser, preferably in accordance with the privacy policy of the health-related web site.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. As a nonlimiting example, the present invention can be utilized in conjunction with an infant wall-mounted changing station. The disposable sanitary paper (or other medium) is preferably printed with text and/or visual medical graphics for setting a soothing environment. The paper medium can also be used in a waiting area as part of an art corner/table where toddlers through teens can solve crossword puzzles, play "fill in the blanks", draw, etc. Soothing backdrops for sanitary paper 10 are also contemplated for calming the patient and leaving the patient less anxious and more able to assist the physician in obtaining information from the patient that may have been less forthcoming.

One of the primary values of some embodiments of the invention is the provision of a customizable consumer-friendly message per the medical community, the drug company or other advertiser's request and/or through person or persons owning and operating public restrooms. The commercial importance of some embodiments of the invention is related to the engaging text and visuals, which offer the opportunity for dialogue between the physicians and the consumer/patient. Preferred embodiments of the invention fill a societal need by being informative and personal at the same time, while inspiring the consumer to ask the necessary questions and/or attempt to a live a healthier life. Embodiments of the invention can also foster an open dialog between the physician and doctor.

For the purpose of further illustration, but without limiting the scope of the invention, the following examples are presented to show a few of the many ways in which preferred embodiments of the invention are implemented:

EXAMPLE 1

A male patient, the consumer, visits a cardiologist at a large hospital in Princeton, N.J. While waiting in the examination room for the cardiologist, the male patient notices that the examination table is covered with a section of sanitary paper, similar in appearance to sanitary paper 10 shown in FIG. 1a. The male patient, while being positioned on seating area 60, turns to read consumer-friendly message 20, finding the health-related advertising information on heart-disease to be quite informative. The male patient also sees consumer coupon 50 for receiving forty-percent off a first prescription for the drug Focus XL. The male patient tears consumer coupon 50 from sanitary paper for later use and writes down URL 30, shown in FIG. 1a as WWW.LIFE-SCAPES.COM, and code 40, shown in FIG. 1a as "cardio."

After returning home, the male patient enters URL 30 into the browser of his computer system to access the health-related web site. When prompted for code 40, the male patient enters the word "cardio." The male patient complies with a request to provide certain consumer information, such as his location, his age, etc. A health-related newsletter is then displayed that may be similar in appearance to consumer-friendly message 20 and that discusses issues of general concern to consumers in the area of cardiology. The male patient is thus able to finish reading an article that he started reading in the examination room. The next day, the male patient uses consumer coupon 50 at his local pharmacy to obtain a discount on a prescription his doctor has written for Focus XL. The host computer system sends the male patient's inputted consumer information to the advertiser computer system associated with the Focus XL. The consumer information indicates an instance of user access associated with cardiology in central New Jersey.

EXAMPLE 2

A baby boy and the boy's mother visit a pediatrician whose medical facility is an in-home office. The child is diagnosed as having strep throat. While in the waiting room of the home office, the mother finds sanitary paper 10, such as that shown in FIG. 1b, covering a baby tray. The mother has also seen the same sanitary paper on the baby tray at a baby changing station in the lavatory of a children's theme park. The mother reads consumer-friendly message 20 to discover informative health tips for raising a healthy child. The mother tears of the portion of sanitary paper 10 articulating URL 30 and code 40.

The next morning on her way to work, the mother accesses the heath-related site from her portable digital assistant (PDA) by entering URL 30 into her browser. The mother chooses not to provide any consumer information but enters code 40 as "kids." The mother is granted access to view the current edition of the health-related newsletter, which is similar in appearance to consumer-friendly message 20 shown in FIG. 1b, but with a slightly different design layout. The current edition addresses health-topics of interest to consumers in the field of pediatrics. The mother believes that the edition is informative and subsequently provides consumer information of a general demographic nature so that she can "sign-up" for future editions of a pediatric health-related newsletter. The mother subsequently receives electronic copies of future editions of the health-related newsletter e-mailed to her consumer computer system. The mother also finds other useful information at the health-related web site concerning the medication prescribed for her child's strep throat. When the mother later receives another edition of the health-related newsletter with new content, a printable consumer coupon is included, which the mother later uses for a discount on diapers at her local pharmacy.

EXAMPLE 3

A pregnant woman and her female friend, the friend being the consumer, visit an obstetrician who works out of a small practice in New York City. The friend walks the pregnant woman into the examination room and, before exiting, notices sanitary paper 10 including an article about health care for pregnant woman. The friend is a married, young adult and realizes that she may be starting a family herself in the near future. Fortunately, sanitary paper 10 was also displayed as a poster in the waiting area and the friend was able to have a moment to read consumer-friendly message 20. In contrast to URL 30 and code 40 shown in FIG. 1c, the sanitary paper in this example articulates the URL WWW.LIFE-SCAPES.COM/OBGYN/ which includes the code "obgyn." The friend is familiar with the health-related web site having previously visited WWW.LIFE-SCAPES.COM to access health-related information about arthritis for her father-in-law.

The friend later accesses the health-related web site and enters the URL, including the code, namely WWW.LIFES-SCAPES.COM/OBGYN/. The host-computer system retrieves from memory the consumer information the friend had previously entered when visiting the health-related web site earlier to learn about arthritis. The friend desires to be able to view current updated information about both arthritis and pregnancy and sets up a customized portal, so that each time the friend accesses the health-related web site, information relating to both arthritis and pregnancy is automatically displayed without the friend having to first search and retrieve the information anew upon each visit to the health-related web site. The friend also customizes the portal so that the host computer system transmits e-mails to the friend, reminding the friend to take her daily vitamin.

EXAMPLE 4

A family physician volunteers his time to assist his local community college in matters relating to sports medicine. The infirmary at the community college has an examination table with examination table sanitary paper. Consumer-friendly message 20 of sanitary paper 10 contains an educational article sponsored by the American College of Sports Medicine (ACSM) covering a topic of sports medicine that is relatively unfamiliar to the general practice, family physician. A URL, SPORTS.LIFE-SCAPES.COM, is printed on the sanitary paper.

Interested in obtaining more information, the family physician uses the computer at the college library to access SPORTS.LIFE-SCAPES.COM, where he is requested to provide medical professional information, such as physician information. The family physician enters physician information, including the geographic location of the family physician's practice, how the family physician heard about the health-related web site and the family physician's American Academy of Family Physicians membership code. By entering this information, the family physician obtains access to professional medical information relating to the topic of the sports-medicine article shown on sanitary paper 10. The professional medical information preferably includes the detailed, "hard" scientific information sought by the family physician. In preferred embodiments, all available professional medical information can be downloaded and printed.

The family physician's medical professional information is preferably forwarded to the ACSM's computer system for market analysis. Although business models vary among various advertisers, the ACSM provides free content to the host computer system for use in the consumer-friendly message as a means for delivering a free public service message designed to increase public awareness of a certain sports-related health risk. A representative of the ACSM can view user information received by the ACSM advertiser computer system from the host computer system. A representative of the ACSM can also access the host computer system over a network to view, for example, a summary of all consumer information entered in association with viewing ACSM content.

What is claimed is:

1. Apparatus for targeted interactive information dissemination and gathering, comprising:
   disposable separably segmented print-bearing medical examination table paper with a consumer-friendly health-related message displayed as a unitary whole on at least some of the separable segments;
   a host computer;
   a visually discernable informational key appearing on each of the separable segments, said key defining an address for communicating connection to said host computer; and
   a visually discernable code appearing on each of the separable segments and defining health-related information clinically correlated with the consumer friendly health-related message to be made available to a person applying said key to a computing device and communicatingly connecting with said host computer;
   said host computer being adapted for remote telecommunicating access by one in possession of one of the separable segments through personal application by such one in possession of one of the separable segments of said visually discernable key to the computing device, thereby causing the computing device to generate and transmit to said host computer an electronic signal responsively to said key and having said code embedded therein, said host computer further being adapted to transmit, responsively to receipt of said electronic signal, information to said computer device corresponding to said code for display on the computing device of said health related information to said one person in possession of the separable segment.

2. Apparatus of claim 1, wherein only some of said segments have the consumer-friendly health related message thereon;
   wherein at least some of said segments have said visually discernable information key thereon; and
   wherein at least some of said segments have at least one of said plurality of visually discernable codes thereon.

3. Apparatus of claim 1, wherein said host computer further comprises a plurality of different health-related information laden templates relating to different health issues available to be selectably displayed at said computing device to persons applying said key and said code to said computing device and connecting with said host computer, wherein the code correlates with a single one of the health issues.

4. Apparatus of claim 1 wherein said visually discernable informational key is a Universal Resource Locator.

5. Apparatus of claim 1 wherein the disposable separably segmented print-bearing medical examination table paper with a consumer-friendly health-related message is displayed as a unitary whole on at least some of the separable segments that are contiguous one with another.

6. Apparatus of claim 1, wherein said message on said medium has text portions with text lines of said message being oriented substantially transversely respecting the paper and positioned to be readable from a seating part of said paper.

7. Apparatus of claim 1, wherein said message on said medium has text portions displayed in a plurality of different fonts and type sizes, optionally in color, with at least some of the letters in at least some of fonts optionally being shaded to create the illusion of three dimensional depth in said medium, with some of the color parts optionally fading to create the illusion of three dimensional depth in said medium.

8. Apparatus of claim 7, wherein the text portions include text lines of said message oriented substantially transversely respecting the medium and positioned to be readable from a seating part of said medium.

9. Apparatus for targeted interactive information dissemination and gathering, comprising:
   a disposable print-bearing medium with a consumer-friendly message displayed as a unitary whole thereon;
   a host computer;
   a visually discernable informational key appearing on said medium, said key defining an address for communicating connection to said host computer; and
   a visually discernable code appearing on said medium and defining information to be made available to a person applying said key to a computing device and communicatingly connecting with said host computer;
   wherein said host computer is adapted for remote telecommunicating access through personal application of said visually discernable key to the computing device generating and transmitting to said host computer an electronic signal responsively to said key and having said code embedded therein, said host computer transmitting, responsively to receipt of said electronic signal, information to said computer device corresponding to said code for display thereon to said person,
   wherein said disposable print bearing medium is medical examination table sanitary paper.

10. Apparatus of claim 9, wherein said paper segments are sized for seating support of patients of a given medical specialty.

11. A method of directing targeted information for an entity to consumers, comprising:
   creating a tangible medium having said information emanating from said entity discernable therefrom by consumers having access to said medium;
   providing a visually discernable informational key on said medium for communicatingly connecting with a data processing system at a remote locale;
   placing said medium in a locale frequented by persons to whom said entity is interested in targeting the information;

telecommunicatingly receiving inquiry communications at said remote locale from a person applying said informational key to an input device adapted for telecommunicative connection with said data Processing system in response to application of said informational key;

causing an information laden template to be transmitted to said person for display in response to receipt of an electronic signal correspondence to said informational key at said remote locale;

periodically refreshing and replacing said template displayed to said person at said input device;

wherein the step of causing an information laden template to be displayed to said person on said input device further comprises selecting one of a plurality of said information laden templates to be displayed at said input device in response to receipt of a selected one of a plurality of visually discernable codes taken from said medium by said person and provided to said input device;

obtaining demographic and/or health-related information about said person as a condition for causing an information laden template to be displayed to the person;

causing the information laden template to be transmitted to said person for display in response to receipt of an electronic signal corresponding to said informational key at said remote locale; and causing the demographic and/or health-related information and visually discernable informational key to be transmitted to the entity while maintaining an association between the demographic and/or health-related information and the visually discernable informational key applied by the person.

12. The method of claim 11, wherein said medium is separable into segments with at least some of said segments having said information thereon, with at least some of said segments having visually discernable informational key thereon and without least some of said segments having at least one of said plurality of visually discernable codes thereon.

13. The method of claim 11 further comprising recording and maintaining the identity of the person making the telecommunicatively transmitted inquiry communication to the remote locale by applying the informational key to an input device;

changing the information laden template display to persons in response to receipt of said electronic signal corresponding to said informational key as such information laden template is displayed at said input device;

wherein changing the informational laden template is performed after a preselected number of hits by a particular person;

comprising receiving second information provided by the person taken from the media and applied by the person along with the informational key to an input device adapted for telecommunicative connection with said remote locale; and comprising collecting second information from a plurality of persons, segregating and dividing said second information according to the code input by each one of said persons providing said second information, furnishing at least a portion of said second information to said entity for analysis and use thereby.

14. The method of claim 11, further comprising periodically refreshing and replacing said template displayed to said person at said input device.

15. The method of claim 11, wherein the step of causing an information laden template to be displayed to said person on said input device further comprises selecting one of a plurality of said information laden templates to be displayed at said input device in response to receipt of a selected one of a plurality of visually discernable codes taken from said medium by said person and provided to said input device.

16. The method of claim 11, wherein said telecommunicative communication is performed via the Internet.

17. The method of claim 11 further comprising changing the information laden template display to persons in response to receipt of said electronic signal corresponding to said informational key as such information laden template is displayed at said input device.

18. The method of claim 17 wherein changing the informational laden template is performed after a preselected number of hits by a particular person.

19. The method of claim 11 further comprising receiving second information provided by the person taken from the media and applied by the person along with the informational key to an input device adapted for telecommunicative connection with said remote locale.

20. The method of claim 19 further comprising collecting second information from a plurality of persons, segregating and dividing said second information according to the code input by each one of said persons providing said second information, furnishing at least a portion of said second information to said entity for analysis and use thereby.

21. A method for targeted education and advertising, comprising:
    a. hosting a health-related newsletter template;
    b. receiving consumer information from a consumer at a host computer system designated by a URL, the URL being displayed at a medical facility in association with health-related advertising information;
    c. receiving a code at the host computer system, the code being displayed at the medical facility in association with the health-related advertising information;
    d. populating the health-related newsletter template with health-related newsletter content selected in accordance with the code to create an edition of the health-related newsletter;
    e. communicating the edition of the health-related newsletter to the consumer; and
    f. communicating the consumer information to an advertiser associated with the health-related advertising information.

* * * * *